(12) United States Patent
Nakayama et al.

(10) Patent No.: US 9,483,841 B2
(45) Date of Patent: Nov. 1, 2016

(54) TRAVEL AMOUNT ESTIMATION DEVICE AND TRAVEL AMOUNT ESTIMATING METHOD

(71) Applicant: FUJITSU LIMITED, Kawasaki-shi, Kanagawa (JP)

(72) Inventors: Osafumi Nakayama, Kawasaki (JP); Munehisa Agari, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/508,046

(22) Filed: Oct. 7, 2014

(65) Prior Publication Data

US 2015/0125040 A1 May 7, 2015

(30) Foreign Application Priority Data

Nov. 1, 2013 (JP) .................................. 2013-228110

(51) Int. Cl.
*G06K 9/00* (2006.01)
*G06T 7/20* (2006.01)
(52) U.S. Cl.
CPC ........... *G06T 7/204* (2013.01); *G06K 9/00791* (2013.01); *G06T 2207/30256* (2013.01)
(58) Field of Classification Search
None
See application file for complete search history.

(56) References Cited

U.S. PATENT DOCUMENTS

| | | | | |
|---|---|---|---|---|
| 8,238,612 B2* | 8/2012 | Susca | .................... | G06T 7/2033 348/154 |
| 8,744,169 B2* | 6/2014 | Othmezouri | .......... | G06T 7/2086 348/42 |
| 2008/0089556 A1* | 4/2008 | Salgian | .................. | G06K 9/209 382/103 |
| 2010/0171828 A1 | 7/2010 | Ishii | | |
| 2011/0128379 A1* | 6/2011 | Lee | ..................... | G06K 9/00805 348/144 |
| 2014/0300732 A1* | 10/2014 | Friend | .................. | G06T 7/0042 348/135 |

FOREIGN PATENT DOCUMENTS

| | | |
|---|---|---|
| JP | 07-318327 | 12/1995 |
| JP | 09-237341 | 9/1997 |
| JP | 10-222665 | 8/1998 |
| JP | 2003-009141 | 1/2003 |

(Continued)

OTHER PUBLICATIONS

Campbell et al., "A robust visual odometry and precipice detection system using consumer-grade monocular vision", Proceedings of the 2005 IEEE International Conference on Robotics and Automation, Apr. 2005.*

(Continued)

*Primary Examiner* — Soo Park
(74) *Attorney, Agent, or Firm* — Fujitsu Patent Center

(57) ABSTRACT

A processor generates a first road surface image from an image at a first time captured by an imaging device mounted on a moving body, and generates a second road surface image from an image at a second time after the first time. Next, the processor determines direction information depending on a direction of travel of the moving body between the first time and the second time from an amount of turn of the moving body between the first time and the second time. Then, the processor determines a relative positional relationship between the first road surface image and the second road surface image by using the amount of turn and the direction information, and determines an amount of travel of the moving body between the first time and the second time on the basis of the relative positional relationship.

7 Claims, 38 Drawing Sheets

(56) References Cited

FOREIGN PATENT DOCUMENTS

| JP | 2003-259359 | 9/2003 |
|---|---|---|
| JP | 2009-060499 | 3/2009 |

OTHER PUBLICATIONS

Takimoto et al., "Development of Monocular Ranging Verification system using In-Vehicle Camera", Jul. 2006, SEI Technical Review, No. 169, pp. 82-87 (19 pages), with English Translation.

* cited by examiner

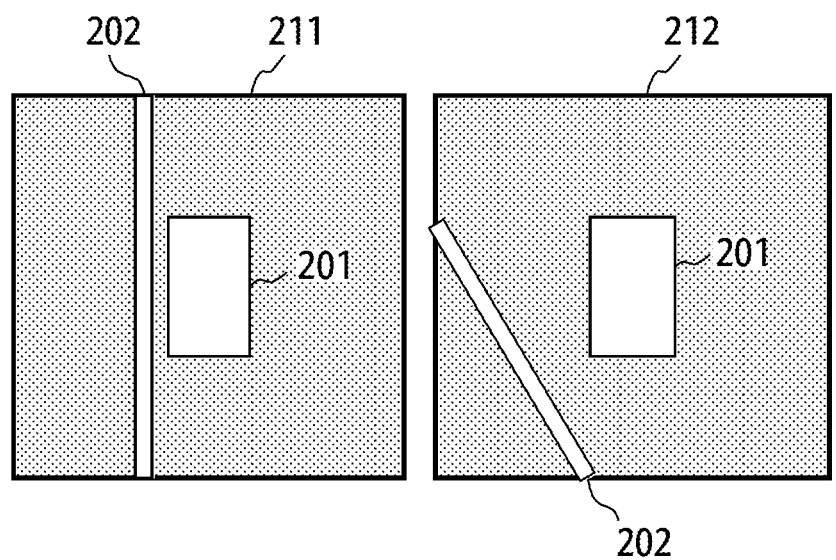
F I G. 3

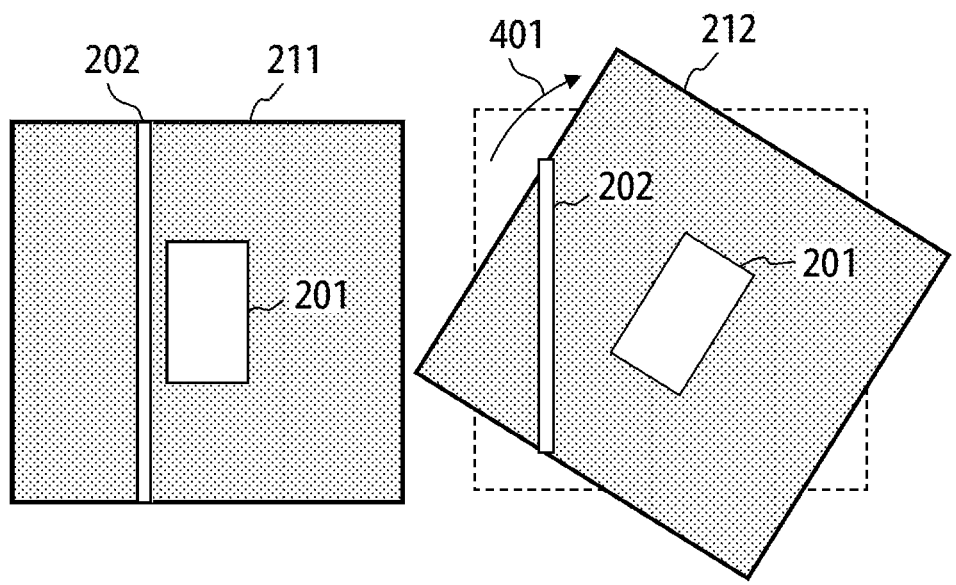
F I G. 4

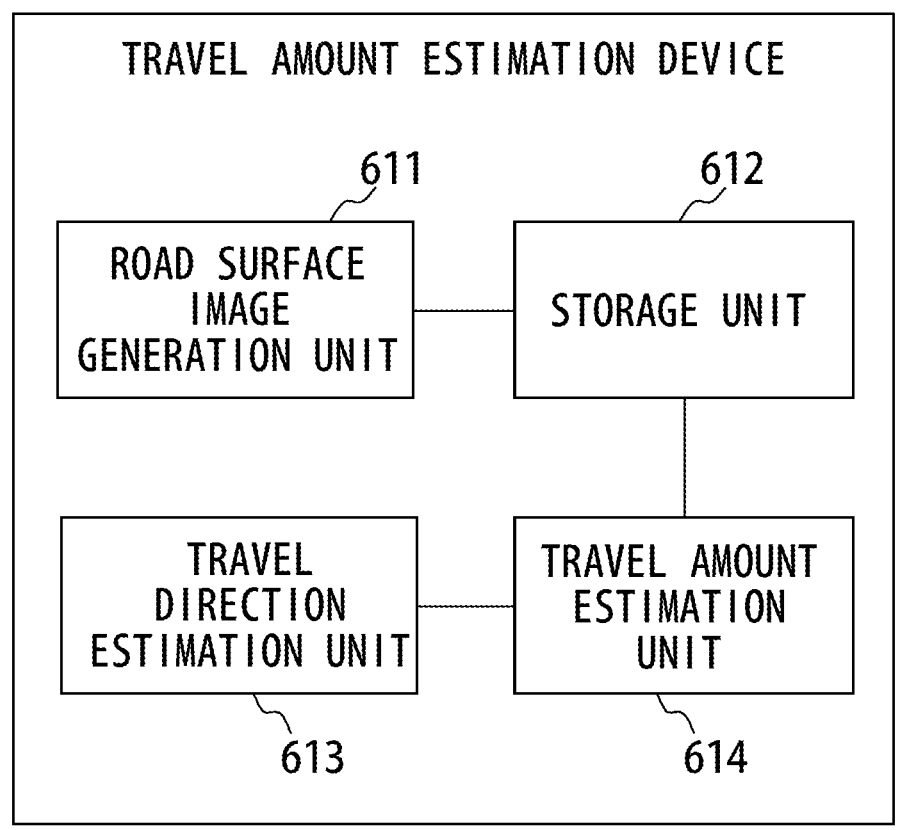
F I G. 6

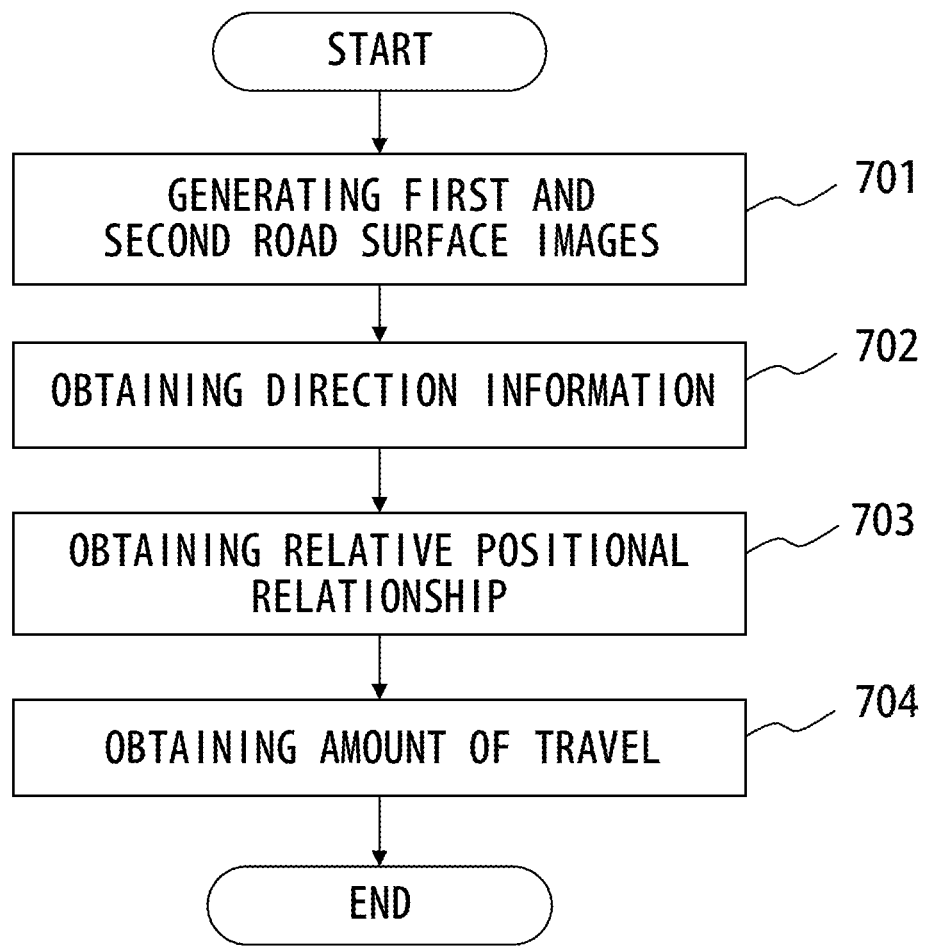
F I G. 7

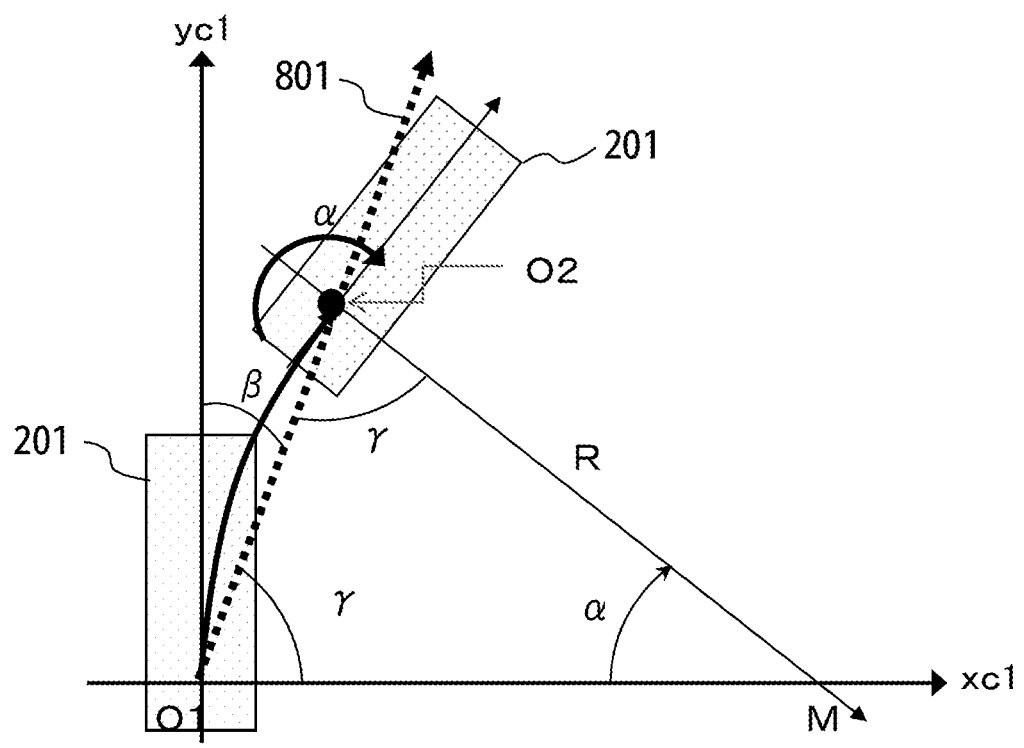
F I G. 8

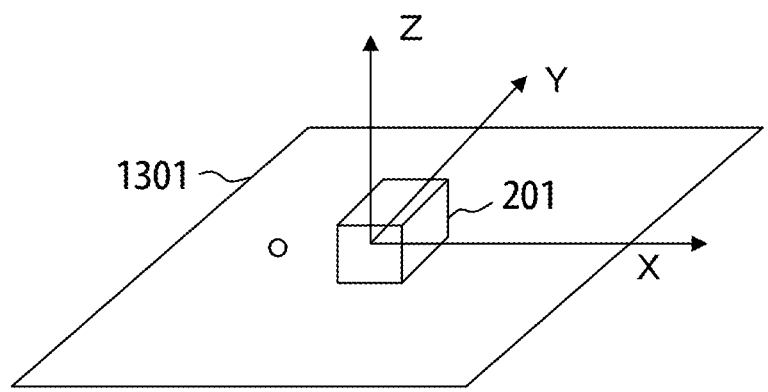
F I G. 13

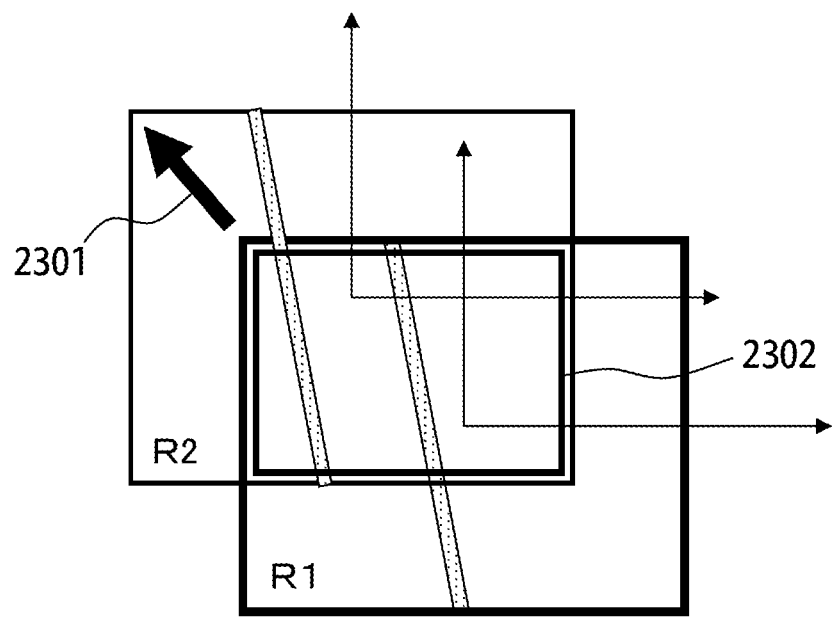
F I G. 23

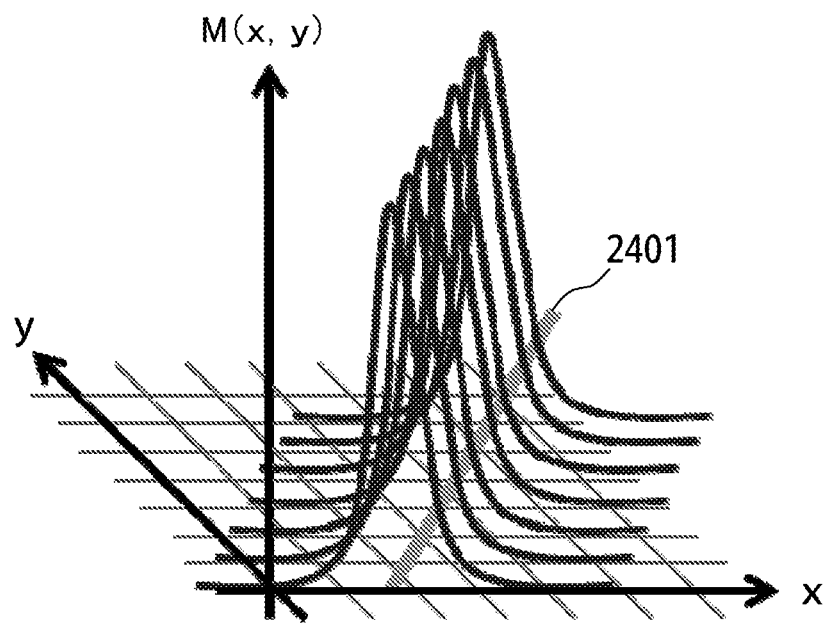
F I G. 24

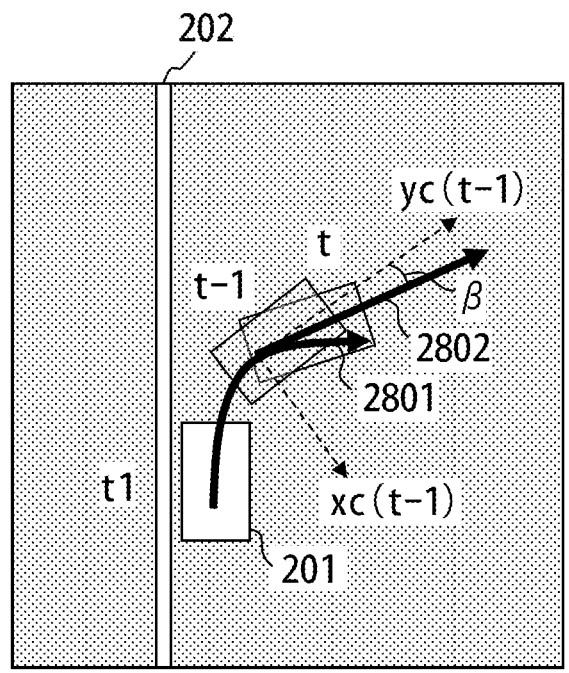
F I G. 28

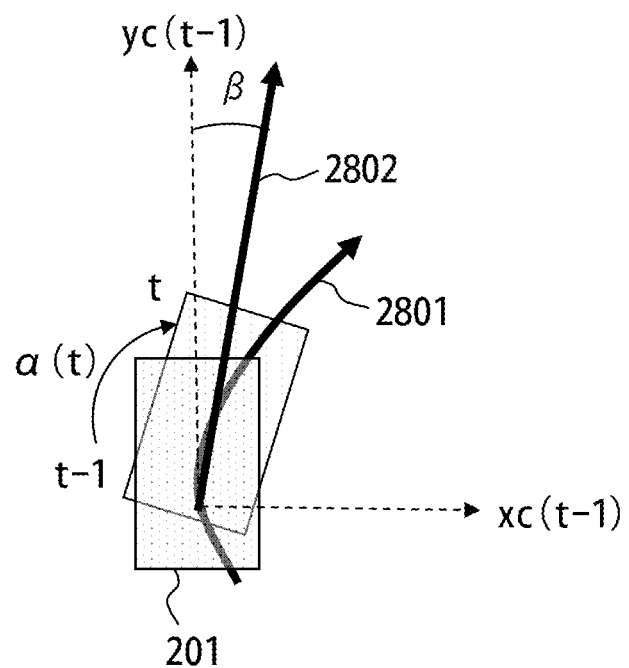
F I G. 29

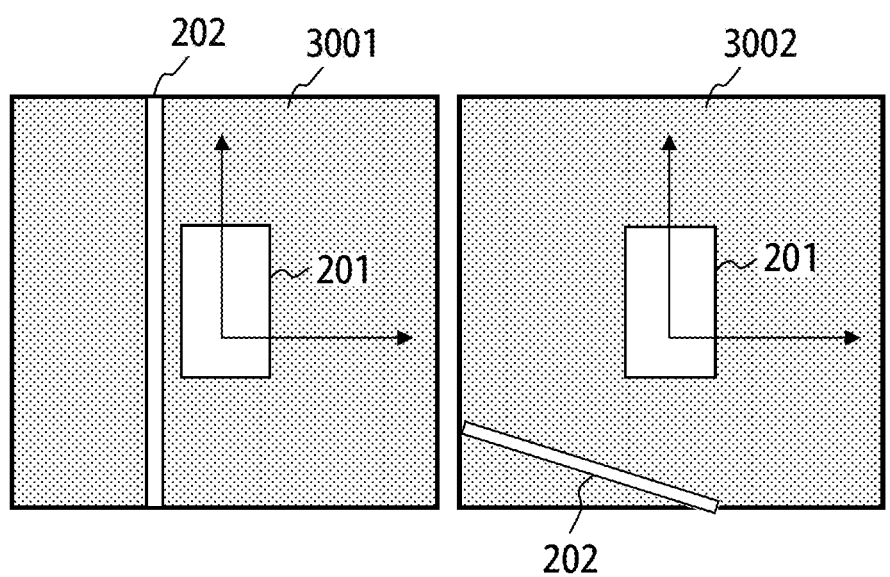
F I G. 3 1

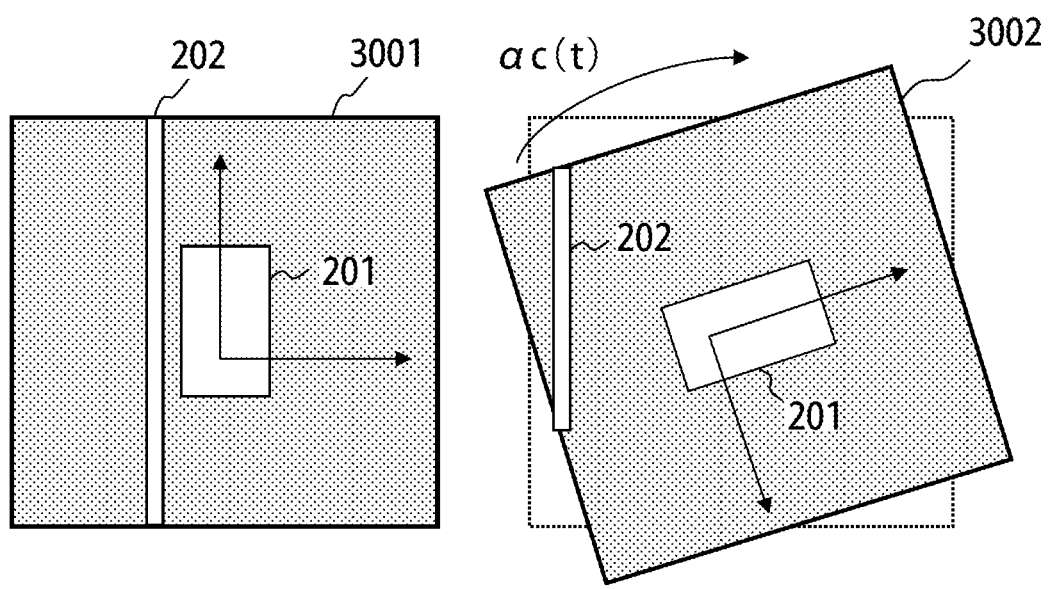
F I G. 3 2

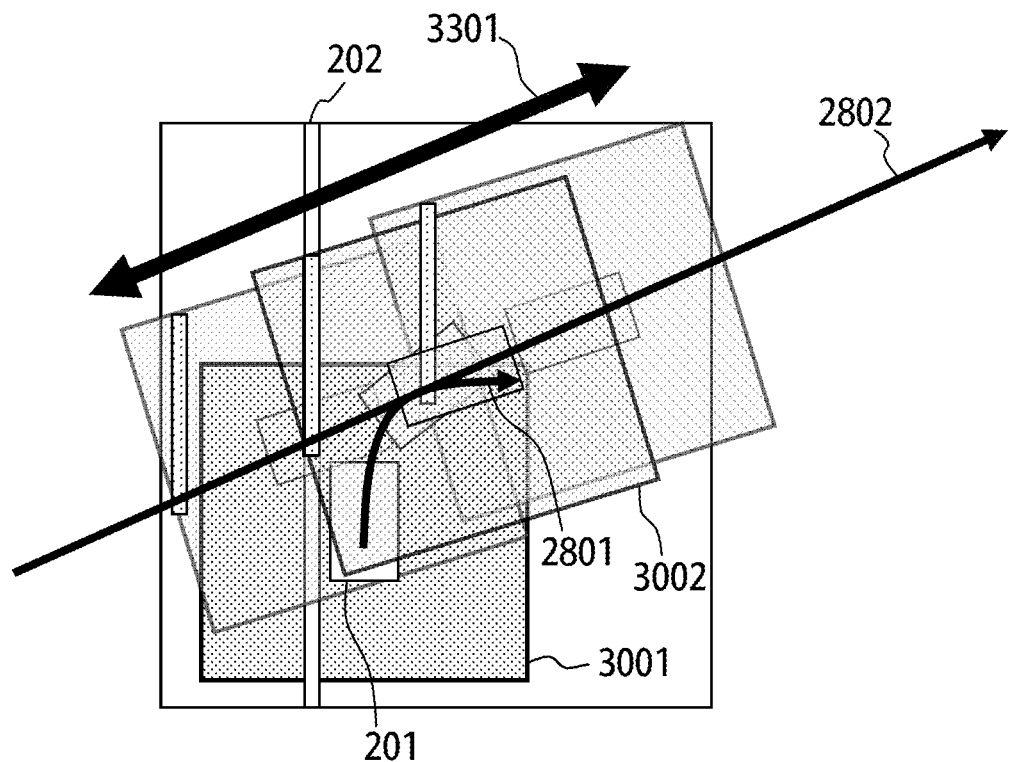
F I G. 33

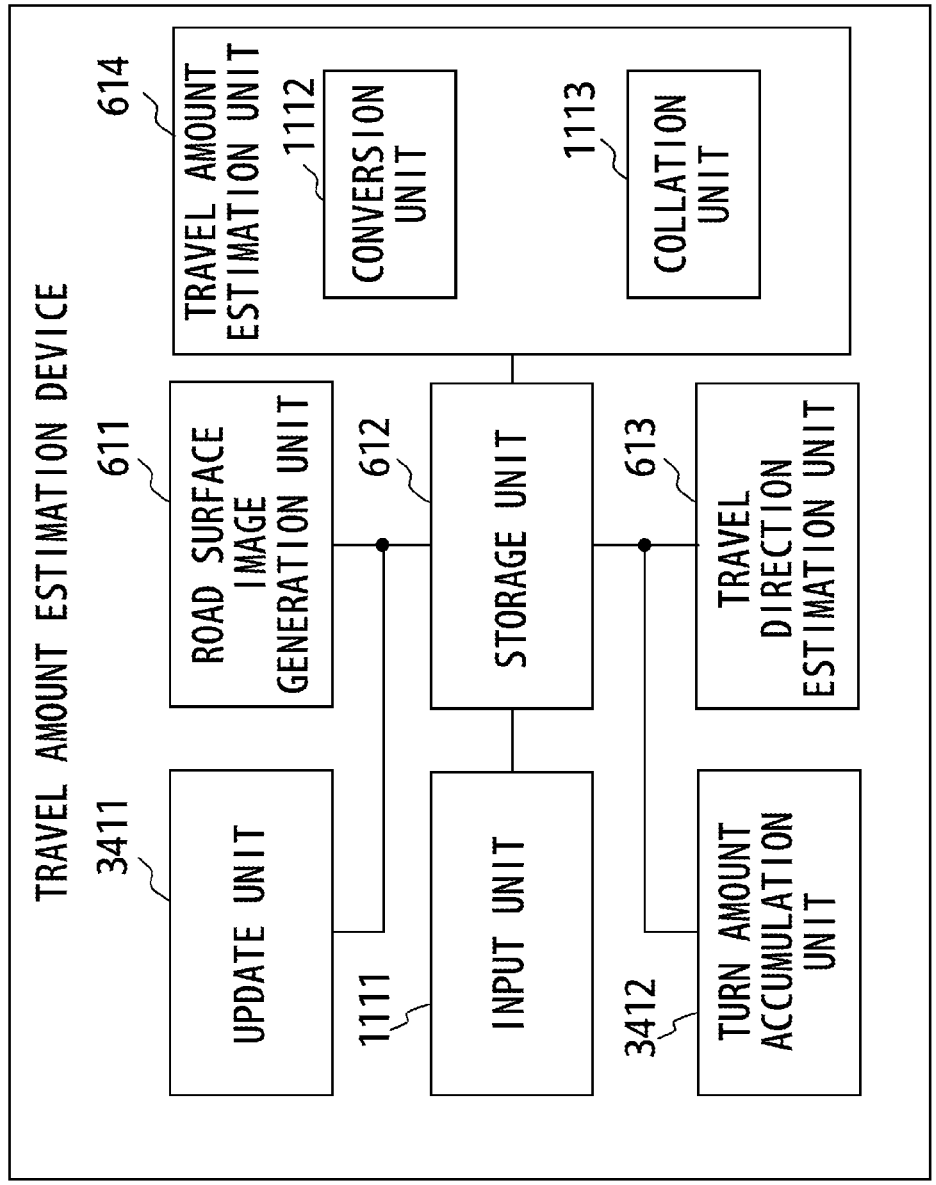
F I G. 34

TRAVEL AMOUNT ESTIMATION DEVICE AND TRAVEL AMOUNT ESTIMATING METHOD

CROSS-REFERENCE TO RELATED APPLICATIONS

This application is based upon and claims the benefit of priority of the prior Japanese Patent Application No. 2013-228110, filed on Nov. 1, 2013, the entire contents of which are incorporated herein by reference.

FIELD

The embodiments discussed herein are relates to a travel amount estimation device and a travel amount estimating method.

BACKGROUND

Conventionally proposed is a method of attaching a camera to a moving body such as a vehicle etc., shooting an image of surroundings, and estimating an amount of travel of the moving body from the amount of travel of a pattern on a road surface. For example, well known is a travel amount estimating method of converting an image of the road surface shot by an on-board camera into a top view image viewed from right above, and determining an amount of travel of a vehicle using the amount of travel of a corresponding point in a top view image between two time points (for example, refer to the non-patent document 1).

Also known is a vehicle surroundings monitor device of generating a viewpoint converted image from an image of the surroundings of a vehicle obtained by capturing the surroundings of the vehicle, superposing viewpoint converted images before and after in time based on the amount of travel of the vehicle and the direction of travel, and composing a plurality of viewpoint converted images (for example, refer to the patent document 1).

Further known is a vehicle surroundings image processing device of generating a first bird's-eye view image and a second bird's-eye view image based on a plurality of images of the surroundings of a vehicle shot at different time points and calculating a motion vector which indicates the traveling state between the two images (for example, refer to the patent document 2).

Also known is a drive support system of acquiring a plurality of shot images from a camera provided for a second vehicle, and estimating a linkage angle of a first vehicle and the second vehicle according to an optical flow generated by the acquired shot images and the travel information about the first vehicle (for example, refer to the patent document 3). The drive support system derives an estimated travel locus of the second vehicle according to the linkage angle and the travel information about the first vehicle.

Also known is an image recognition device of comparing the image data of a first image with the image data of a second image, and detecting the traveling state of an object from the difference (for example, refer to the patent document 4). The image recognition device changes the comparison range of the second image depending on the speed of a vehicle.

Further known is a 3-dimensional contour position correcting method of matching the image data of a reference object obtained by an observation by a camera with the image data of a correction target which is obtained by an observation by a camera, and calculating the amount of translation and amount of rotation of the correction target (for example, refer to the patent document 5).

Also known is a 3-dimensional information recovery device of simplifying the motional condition of a camera from the restrictive condition of the rotation matrix and the translation vector between two images of a 3-dimensional rigid body, and calculating the rotation matrix and the translation vector (for example, refer to the patent document 6).

Patent Document 1: Japanese Laid-open Patent Publication No. 2003-259359
Patent Document 2: Japanese Laid-open Patent Publication No. 2003-009141
Patent Document 3: Japanese Laid-open Patent Publication No. 2009-060499
Patent Document 4: Japanese Laid-open Patent Publication No. 10-222665
Patent Document 5: Japanese Laid-open Patent Publication No. 7-318327
Patent Document 6: Japanese Laid-open Patent Publication No. 9-237341
Non-patent Document 1: Takimoto and Ito "Development of monocular ranging verification system using in-vehicle camera", July 2006, SEI Technical Review, No. 169, p. 82-87

SUMMARY

According to an aspect of the embodiments, the travel amount estimation device includes a processor.

The processor generates a first road surface image from an image at a first time shot by an imaging device mounted on a moving body, and generates a second road surface image from an image at a second time.

Next, the processor determines direction information depending on the direction of travel of a moving body between the first time and the second time from an amount of turn of the moving body between the first time and the second time. Then, the processor determines a relative positional relationship between the first road surface image and the second road surface image by using the amount of turn and the direction information, and determines the amount of travel of the moving body between the first time and the second time on the basis of the relative positional relationship.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates a road surface image at two time points;
FIG. 4 illustrates the rotation of a road surface image;
FIG. 6 illustrates the first functional configuration of the travel amount estimation device;
FIG. 7 is a flowchart of the first travel amount estimating process;

FIG. 8 illustrates the relationship between the amount of turn and the direction of travel;

FIG. 13 illustrates a moving body coordinate system;

FIG. 23 illustrates an amount of shift;

FIG. 24 is a weight map;

FIG. 28 illustrates the moving body at three time points;

FIG. 29 illustrates the direction of travel in the rotation center coordinate system;

FIG. 31 illustrates a road surface image at the time t1 and a road surface image at the time t;

FIG. 32 illustrates the rotation of the road surface image at the time t;

FIG. 33 illustrates the second collating process using the restriction of the direction of travel;

FIG. 34 illustrates the third functional configuration of the travel amount estimation device;

DESCRIPTION OF EMBODIMENTS

The embodiments of the present invention are described below in detail with reference to the attached drawings.

Figure 1:
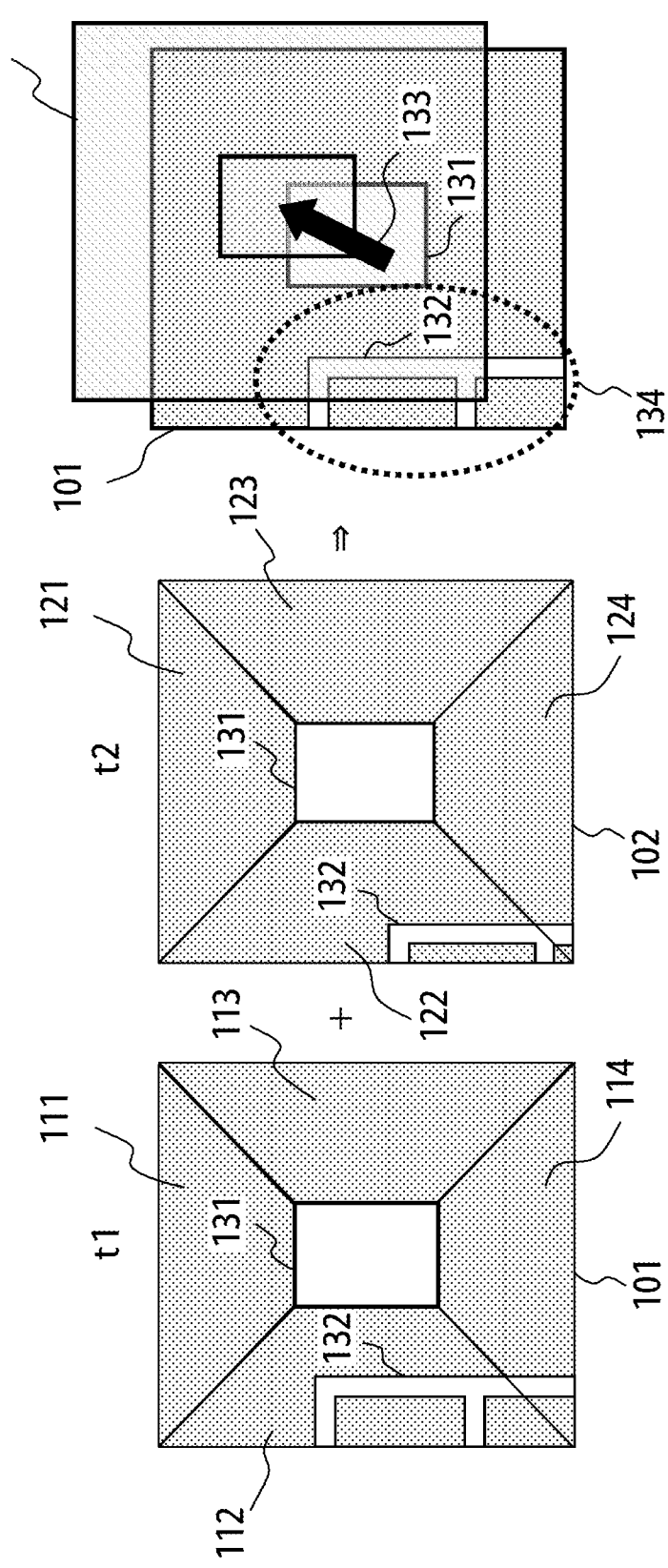
FIG. 1 illustrates the collating process of two road surface images.

When the travel amount estimating method according to the non-patent document 1 is used, an amount-of-travel 133 of a moving body 131 may be estimated based on a road surface image 101 at the time t1 and a road surface image 102 at the time t2 after the time t1 as illustrated in FIG. 1. For example, a top view image is used as the road surface image 101 and the road surface image 102.

The road surface image 101 includes partial images 111 through 114 in four directions, that is, forward, backward, right, and left of the moving body 131 and the road surface image 102 includes partial images 121 through 124 in the four directions. The partial images in the four directions are generated using, for example, four images captured by four cameras provided in the respective directions of the moving body 131.

In this case, the road surface image 101 is collated with the road surface image 102, and the road surface image 101 and the road surface image 102 are superposed so that the image patterns of the road surface patterns 132 of two images in an area 134 may most match. As the road surface pattern 132, for example, a lane dividing line such as a white line etc. is used. Then, the amount-of-travel 133 of the moving body 131 is estimated from the amount of displacement of the position of the moving body 131 between the road surface image 101 and the road surface image 102. The amount of travel of the moving body 131 may be continuously estimated by repeating the similar operation while shifting two time points in time series.

Figure 2:
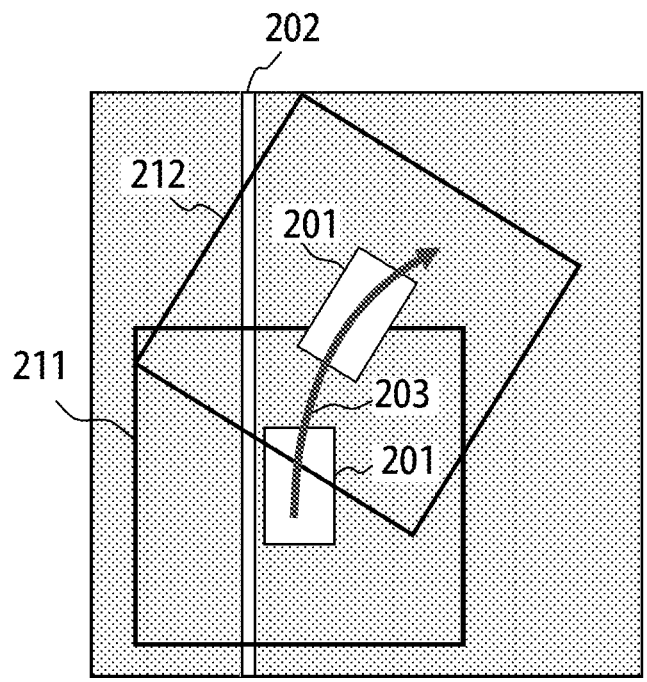
FIG. 2 illustrates a moving body which travels while turning on a road surface.

However, when the road surface pattern is a linear pattern, the relative positional relationship between the road surface image 101 and the road surface image 102 is not uniquely determined in some cases. For example, assume that, as illustrated in FIG. 2, a moving body 201 travels while turning as indicated by an arrow 203 on the road surface on which a linear road surface pattern 202 like a lane dividing line exists. The amount of turn of the moving body 201 may be detected by an angle sensor such as a gyrosensor provided for the moving body 201.

A road surface image 211 is a road surface image at the time t1, and a road surface image 212 is a road surface image at the time t2 after the time t1. The road surface image 211 and the road surface image 212 are horizontally arranged as illustrated in FIG. 3.

As illustrated in FIG. 4, a change made by the turn of the moving body 201 between the time t1 and the time t2 is offset by turning the road surface image 212 by the amount of turn as indicated by an arrow 401. The amount of travel of the moving body 201 is determined as an amount of translation displacement by collating images using an image pattern between the road surface image 211 and the turned road surface image 212.

Figure 5:
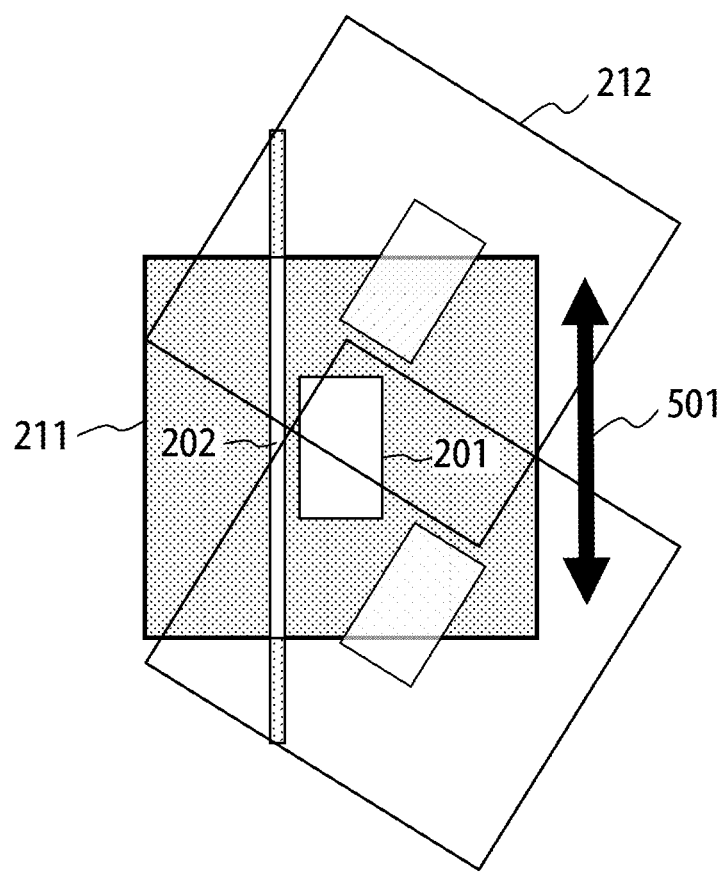
FIG. 5 illustrates the uncertainty of the position of a road surface image.

In this case, since the road surface pattern 202 has a linear pattern, the corresponding position of the turned road surface image 212 is not determined in the direction along the road surface pattern 202 as illustrated in FIG. 5. In this case, as indicated by an arrow 501, there occurs uncertainty in corresponding position in the direction along the road surface pattern 202, and it becomes difficult to determine a correct amount of translation displacement.

Then, desired is a technology of estimating the amount of travel of a moving body with high accuracy although the relative positional relationship between the images captured from a moving body at two time points is not determined from a road surface pattern. The above-mentioned problem occurs not only with a vehicle but also with another moving body which travels on a road surface.

FIG. 6 illustrates an example of the first functional configuration of the travel amount estimation device. A travel amount estimation device 601 includes a road surface image generation unit 611, a storage unit 612, a travel direction estimation unit 613, and a travel amount estimation unit 614.

FIG. 7 is a flowchart of an example of a travel amount estimating process performed by the travel amount estimation device 601 in FIG. 6.

First, the road surface image generation unit 611 generates a first road surface image from an image captured at a first time by an imaging device mounted on an moving body, and generates a second road surface image from an image at a second time after the first time (step 701). Then, the road surface image generation unit 611 stores the first road surface image and the second road surface image in the storage unit 612.

Next, the travel direction estimation unit 613 determines the direction information depending on the direction of travel of the moving body between the first time and the second time from the amount of turn of the moving body between the first time and the second time (step 702).

Next, the travel amount estimation unit 614 determines the relative positional relationship between the first road surface image and the second road surface image by using the amount of turn and the direction information (step 703). Then, the travel amount estimation unit 614 determines the amount of travel of the moving body between the first time and the second time (step 704).

A moving body may be an object which travels on a road surface like a vehicle, a motorbike, a bicycle, a self-propelled robot, etc. An object which travels on a road surface may be an animal.

In the above-mentioned travel amount estimating process, the amount of travel of a moving body may be estimated with high accuracy although the relative positional relationship between the images at two time points captured from a moving body is not determined from a road surface pattern.

The travel amount estimation device according to the present embodiment generates a road surface image from an image of surroundings captured by at least one camera mounted on a moving body, and estimates the amount of travel of the moving body based on the image pattern of a road surface image. The travel amount estimation device may be a device mounted on the moving body such as an on-board device, or a device not mounted on the moving body like a server. The travel amount estimation device may be used in a system as described below.

(1) A system of performing a dangerous drive analysis by analyzing the behavior of a vehicle from an image captured by a camera attached to at least one direction in forward, backward, left, and right of the vehicle.

(2) A system of measuring the position of a surrounding object in a motion stereo method based on the amount of travel of a vehicle and a trail of a feature point of an image.

Described first is the restrictive condition of the direction of travel of a moving body. The moving body 201 in FIG. 8 has a rear wheel axle and a front wheel axle like a vehicle, and travels by setting the wheels on the rear wheel axle as driving wheels, and the wheels on the front wheel axle as steered wheels. Then, assume that the running speed of the moving body 201 is sufficiently low and the interval between the two time points is sufficiently short. In this case, the driving wheels and the steered wheels indicate no slip, move by rotation, and the travel between two time points can be approximated by a rotating movement.

In FIG. 8, the rotation center O1 of the moving body 201 at the time t1 and the rotation center O2 of the moving body 201 at the time t2 after the time t1 are the central position of the rear wheel axle. The center-of-turn M of the moving body 201 is positioned on the xc1 axis of the (xc1, yc1) coordinate system having a rotation center O1 as an origin. The moving body 201 turns by the amount-of-turn α on the center-of-turn M between the time t1 and the time t2. The triangle O1-O2-M is an isosceles triangle having the amount-of-turn α as a vertex angle, and the lengths of the side O1-M and the side O2-M are equal to the turning radius R.

Assuming that the angle made by the side O1-M and the side O1-O2 of the triangle O1-O2-M is γ, and the angle made by the yc1 axis and a direction-of-travel 801 of the moving body 201 is β, the following equations hold true based on the geometric relationship illustrated in FIG. 8.

$$\gamma=(180°-\alpha)/2=90°-\alpha/2 \quad (1)$$

$$\beta=90°-\gamma=90°-(90°-\alpha/2)=\alpha/2 \quad (2)$$

Figure 9:
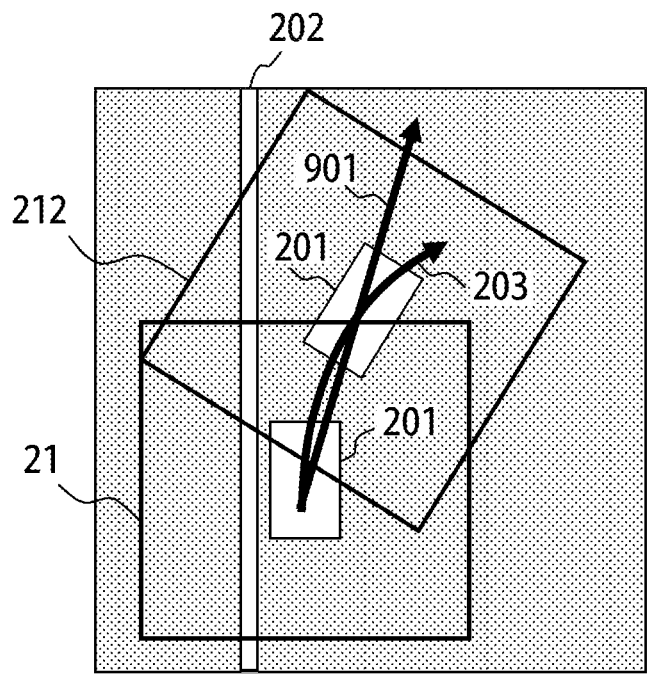
FIG. 9 illustrates the direction of travel on a road surface image.

Accordingly, there is the relationship of β=α/2 between the amount-of-turn α of the moving body 201 and the angle β indicating the direction-of-travel 801. Thus, the Inventors have recognized that if the amount-of-turn α is detected by the angle sensor etc. provided for the moving body 201, the direction-of-travel 801 may be determined although the amount of travel itself is not determined due to the physical restrictions of the moving body 201. Using the relationship, a direction-of-travel 901 of the moving body 201 between the time t1 and the time t2 may be restricted as illustrated in FIG. 9 although the moving body 201 turns as illustrated in FIG. 2.

Figure 10:
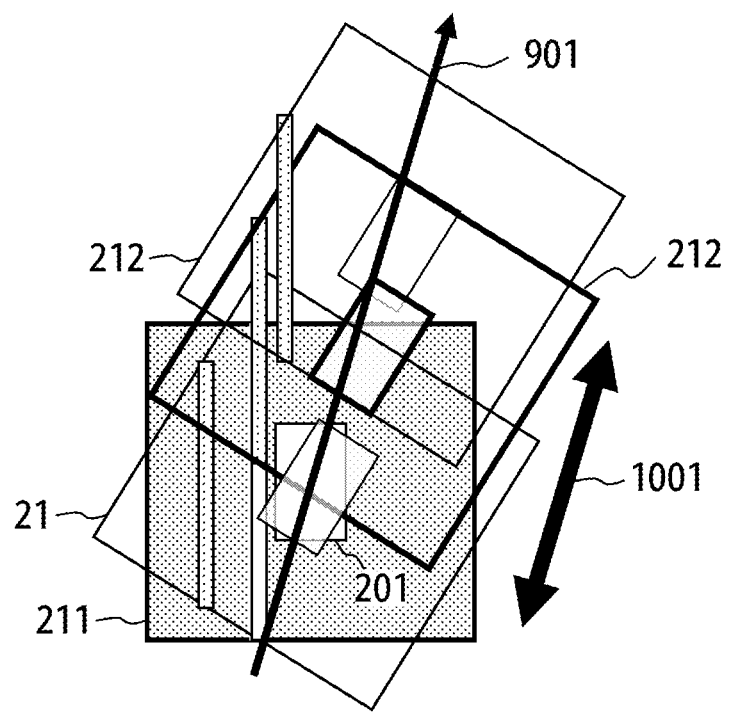
FIG. 10 illustrates the first collating process using the restriction of the direction of travel.

In collating the images between the road surface image 211 and the road surface image 212 in FIG. 5, the images are perturbed in a 2-dimensional area unless there are restrictions. However, using the restrictions of the direction-of-travel 901, the 2-dimensional perturbation may be restricted to the 1-dimensional perturbation as illustrated in FIG. 10. Therefore, although there is only a linear road surface pattern, the relative positional relationship between the road surface image 211 and the road surface image 212 may be uniquely determined, thereby determining a correct amount of translation displacement.

Figure 11:
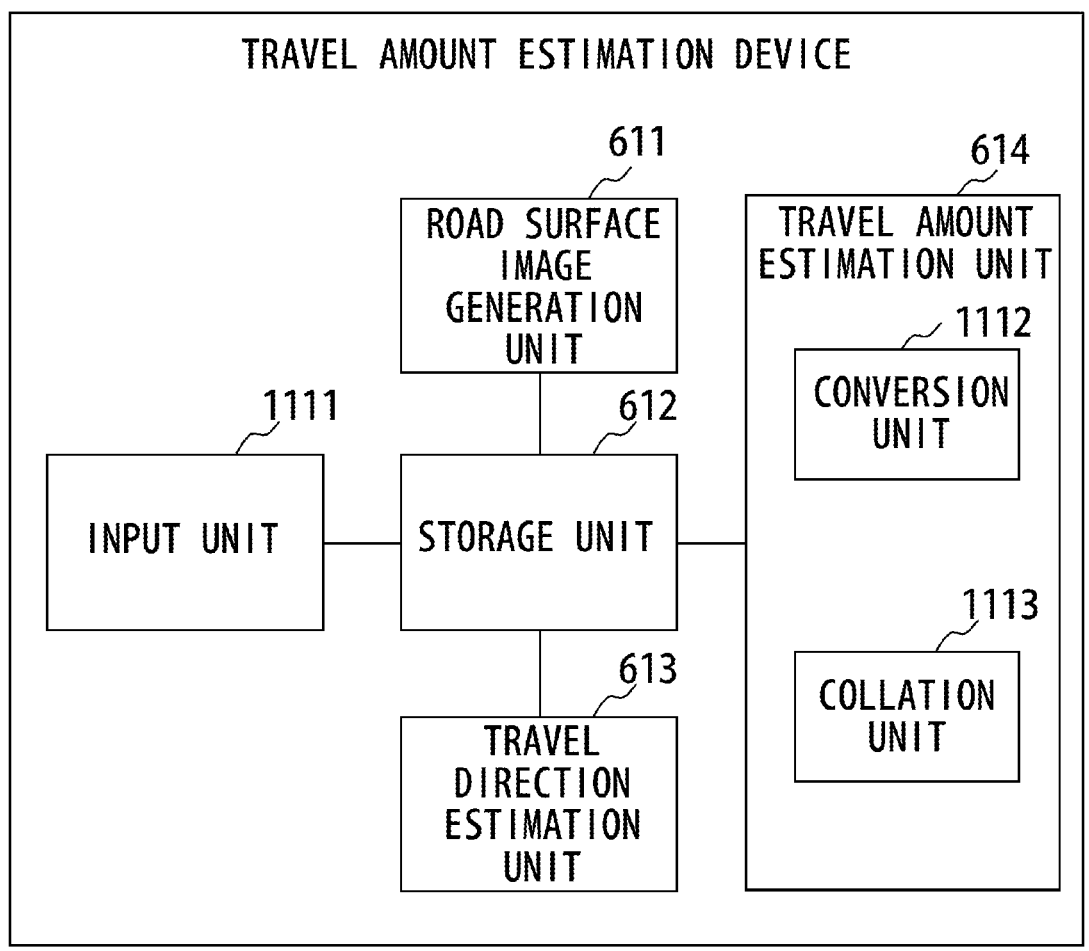
FIG. 11 illustrates the second functional configuration of the travel amount estimation device.

FIG. 11 is an example of the second functional configuration of the travel amount estimation device. A travel amount estimation device 1101 in FIG. 11 includes a road surface image generation unit 611, a travel direction estimation unit 613, a travel amount estimation unit 614, and an input unit 1111. The travel amount estimation unit 614 includes a conversion unit 1112 and a collation unit 1113.

Figure 12:
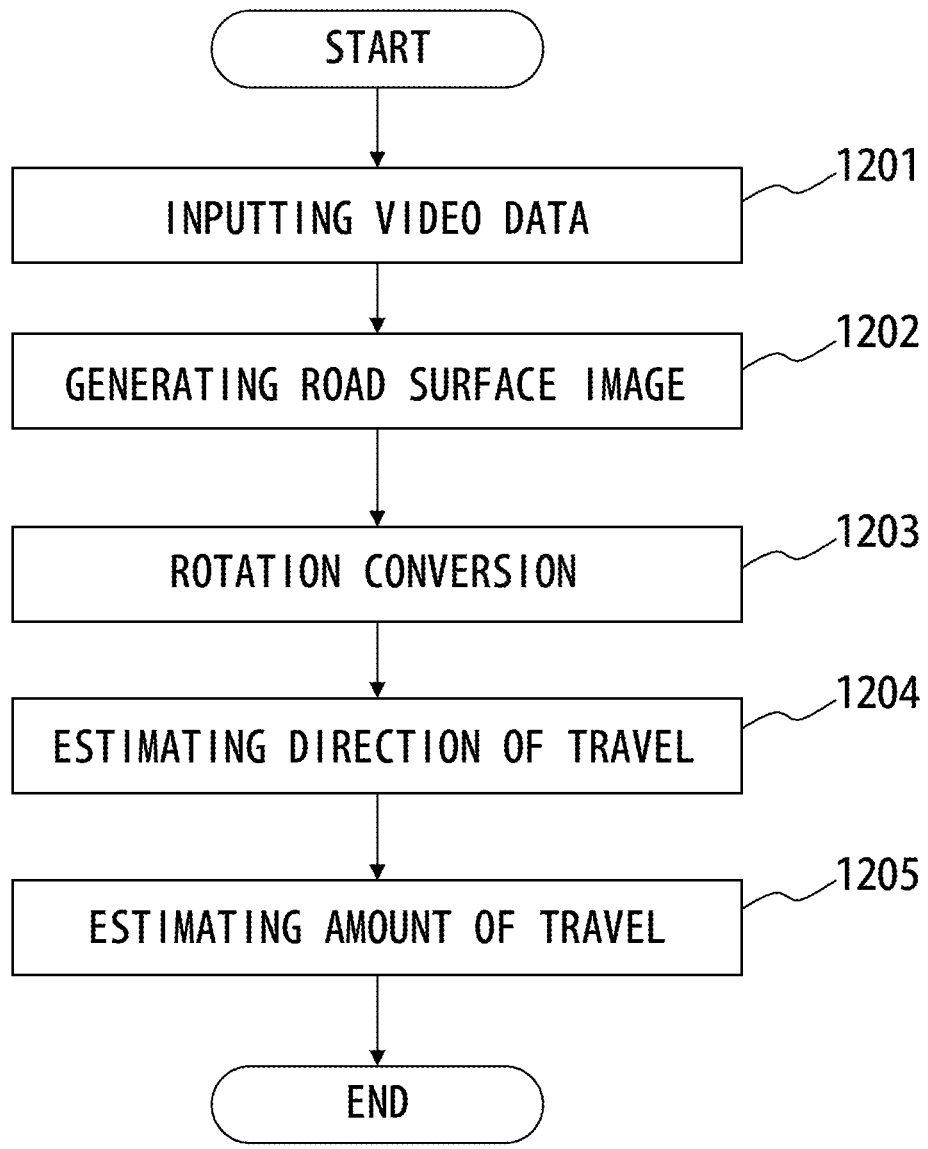
FIG. 12 is a flowchart of the second travel amount estimating process.

FIG. 12 is a flowchart of an example of the travel amount estimating process performed by the travel amount estimation device 1101 illustrated in FIG. 11.

First, the input unit 1111 stores in the storage unit 612 the video data captured by one or more cameras mounted on the moving body 201 (step 1201). When the travel amount estimation device 1101 is mounted on the moving body 201, the video data is input from a camera and when the travel amount estimation device 1101 is not mounted on the moving body 201, the video data is input from a communication network etc.

If the input video data refers to an analog video image, the input unit 1111 may convert the analog video image into a digital video image. If the input digital video image or a converted digital video image is a color video image, the input unit 1111 may convert the color video image into a gray-scale video image. When a plurality of cameras are mounted on the moving body 201, the input unit 1111 stores in the storage unit 612 the video data captured by each camera.

Next, the road surface image generation unit 611 generates road surface images at plural time points from the video data stored in the storage unit 612, and stores the generated road surface images in the storage unit 612 (step 1202). The road surface image indicates a road surface as viewed from above, and is, for example, a gray-scale image. The road surface image generation unit 611 generates a road surface image by projecting an image at each time point included in the video data on the road surface.

Next, the conversion unit 1112 of the travel amount estimation unit 614 rotates the road surface image at the later time point between the road surface images acquired at two time points and stored in the storage unit 612 based on the amount of turn between two time points input externally, and stores the rotated road surface image in the storage unit 612 (step 1203). When the travel amount estimation device 1101 is mounted on the moving body 201, the amount of turn is input from the angle sensor etc. When the travel amount estimation device 1101 is not mounted on the moving body 201, the amount of turn is input from a communication network, etc.

Next, the travel direction estimation unit 613 determines the direction information depending on the direction of travel of the moving body 201 between two time points based on the amount of turn between the two time points, and stores the result in the storage unit 612 (step 1204).

Next, the collation unit 1113 of the travel amount estimation unit 614 determines the relative positional relationship between the road surface images at two time points using the direction information, and determines the amount of travel of the moving body 201 between two time points based on the relative positional relationship (step 1205). In this case, the collation unit 1113 determines the amount of shift where two road surface images correspond while shifting the rotated road surface image along the direction indicated by the direction information from the road surface image at the earlier time point of the road surface images at two time points, and determines the amount of travel based on the amount of shift. Then, the collation unit 1113 stores the determined amount of travel in the storage unit 612.

The amount of travel of the moving body 201 at each time interval may be determined by repeating a similar process while shifting time points by using the later time point in two time points as a new earlier time point. In the system which performs a dangerous drive analysis, the travel amount estimation unit 614 may output the determined amount of travel to the dangerous drive analyzing process. In the system which measures the position of a surrounding object, the travel amount estimation unit 614 may output the determined amount of travel to the object position calculating process.

Figure 14:
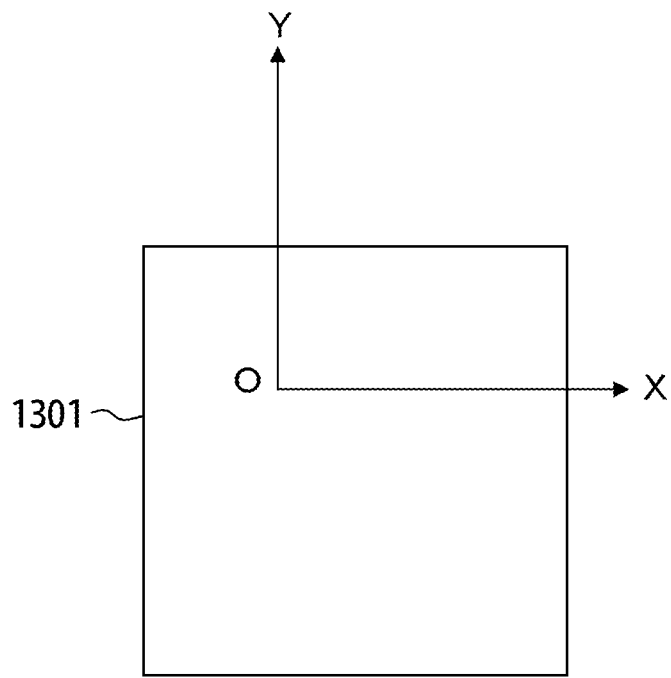
FIG. 14 illustrates a road surface coordinate system.

FIG. 13 is an example of a moving body coordinate system. The moving body coordinate system O-XYZ in FIG. 13 is a 3-dimensional coordinate system on the moving body 201, and its origin O is located on a road surface 1301 immediately below the moving body 201. The X axis is a coordinate axis toward the right of the moving body 201 from the origin O. The Y axis is a coordinate axis toward the front of the moving body 201 from the origin O. The Z axis is a coordinate axis upward the road surface 1301 from the origin O. In this case, as illustrated in FIG. 14, a road surface coordinate system O-XY is defined on the XY plane.

Figure 15:
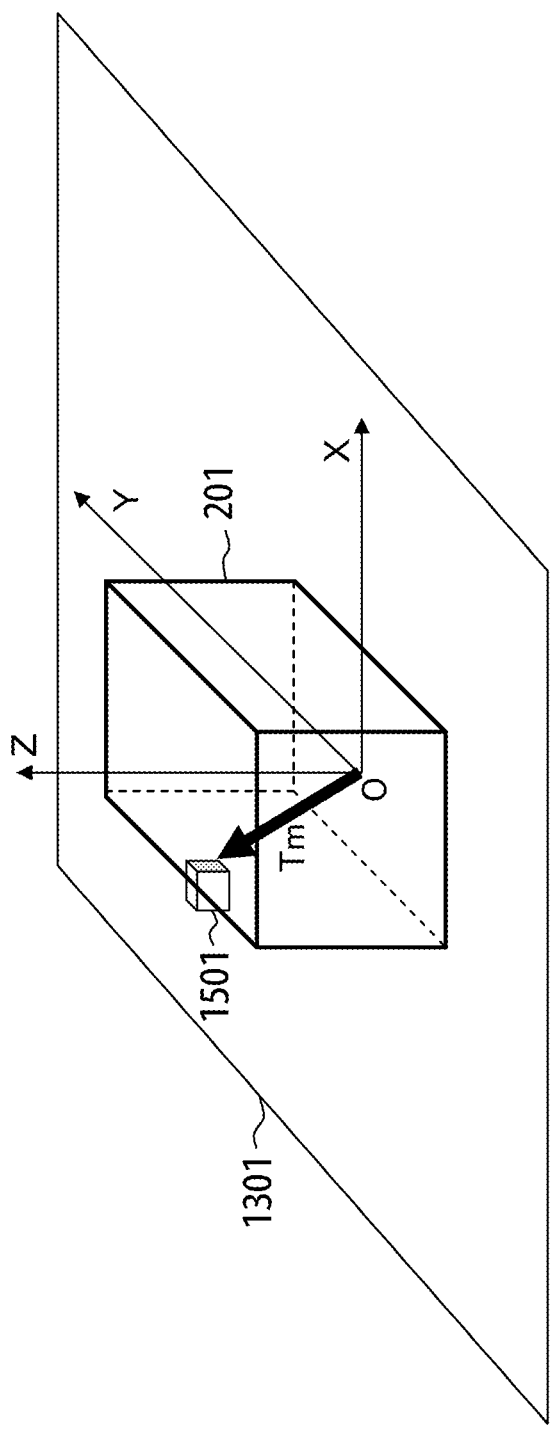
FIG. 15 illustrates the position and the posture of a camera.

As illustrated in FIG. 15, the position and the posture of the m-th (m is an integer not less than 1) camera 1501 mounted on the moving body 201 may be expressed by the translation vector Tm and the rotation matrix Rm in the moving body coordinate system O-XYZ.

Figure 16:
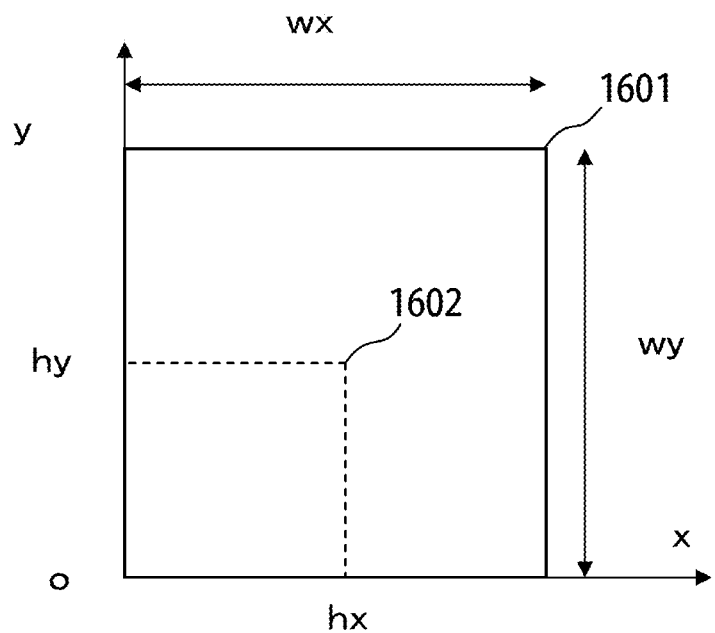
FIG. 16 illustrates an image coordinate system of a road surface image.

FIG. 16 is an example of an image coordinate system of a road surface image. The image coordinate system o-xy in FIG. 16 is a 2-dimensional coordinate system of a road surface image 1601 generated by the road surface image generation unit 611, and its origin o is a vertex at the lower left of the road surface image 1601. The following equations hold true by assuming that the size in the x-axis direction of the road surface image 1601 is wx, the size in the y-axis direction is wy, and the coordinates of a center 1602 of the road surface image 1601 are (hx, hy).

$$hx = wx/2 \qquad (11)$$

$$hy = wy/2 \qquad (12)$$

Figure 17:
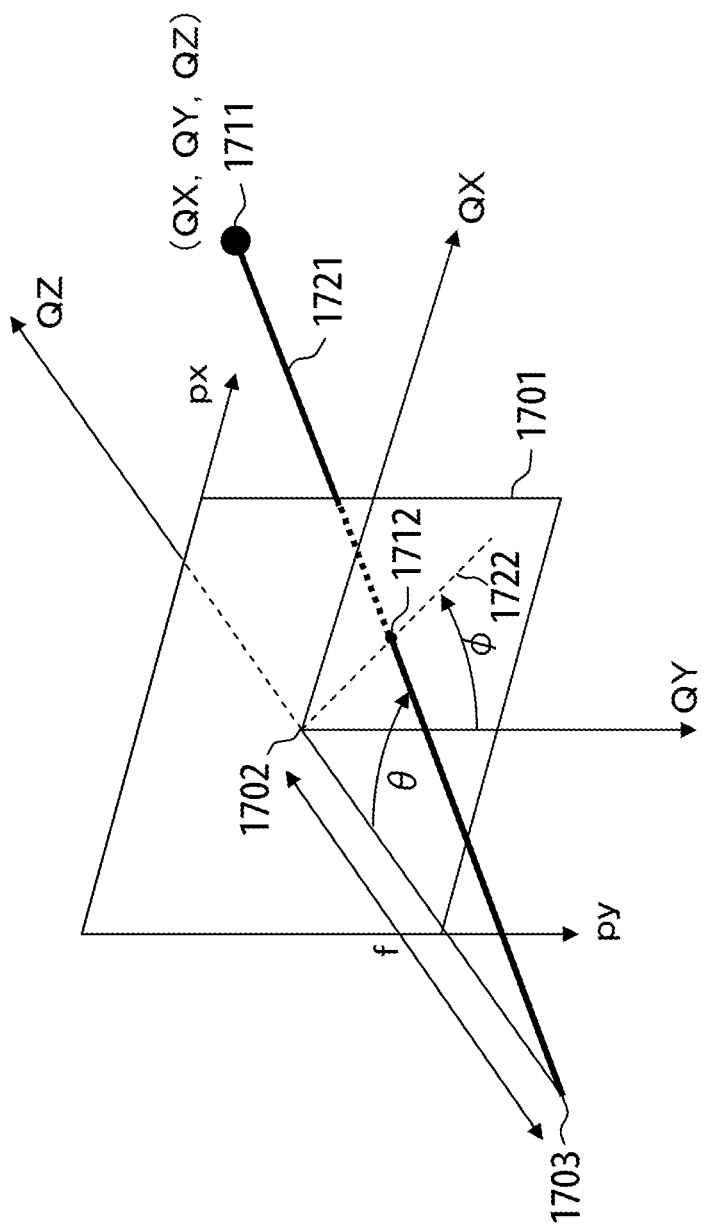
FIG. 17 illustrates a camera coordinate system and an image coordinate system of a camera image.

FIG. 17 is an example of a camera coordinate system. The image coordinate system px-py in FIG. 17 is a 2-dimensional coordinate system of a camera image 1701 on the imaging surface of the camera 1501. The px axis is a coordinate axis in the horizontal direction of the camera image 1701, and the py axis is a coordinate axis in the vertical direction of the camera image 1701.

The camera coordinate system QX-QY-QZ is a 3-dimensional coordinate system having a center 1702 of the camera image 1701 as an origin. The QZ axis is located on the optical axis of the camera 1501, and the QX axis and the QY axis are located on the plane vertical to the optical axis. When the point 1703 which is the focal distance f of the camera 1501 away from the center 1702 in the negative direction of the QZ axis is connected to the point 1711 on an object to be captured by the camera 1501 by the straight line 1721, the straight line 1721 and the camera image 1701 cross each other at an intersection 1712. In this case, the point 1711 on the object is projected to the intersection 1712 on the camera image 1701.

Assume that the coordinates of the point 1711 on the object are (QX, QY, QZ), the angle made by the QZ axis and the straight line 1721 is θ, and the angle made by the QY axis and a straight line 1722 connecting the center 1702 to the intersection 1712 is φ. Also assume that the coordinates of the center 1702 in the image coordinate system px-py are (vx, vy), the coordinates of the intersection 1712 on the camera image 1701 are (px, py), and the pixel value of the pixel corresponding to the intersection 1712 is pm(px, py). In addition, assume that the actual size on the road surface 1301 corresponding to the size in the x-axis direction of one pixel of the road surface image 1601 is MX, and that the actual size on the road surface 1301 corresponding to the size in the y-axis direction of one pixel of the road surface image 1601 is MY.

In this case, the pixel value v of the pixel corresponding to the coordinates (x, y) on the road surface image 1601 is obtained by the following equations.

$$v = pm(px, py) \qquad (13)$$

$$px = f * r * \sin(\phi) + vx \qquad (14)$$

$$py = f * r * \cos(\phi) + vy \qquad (15)$$

$$r = \tan(\theta) \qquad (16)$$

$$\theta = \arctan(sqrt(QX^2 + QY^2)/QZ) \qquad (17)$$

$$\phi = \arctan(QX/QY) \qquad (18)$$

$$\begin{pmatrix} QX \\ QY \\ QZ \end{pmatrix} = Rm * (U - Tm) \qquad (19)$$

Rm is a rotation matrix of the camera 1501, and Tm is a translation vector of the camera 1501. U indicates the coordinates in the road surface coordinate system O-XY at the position corresponding to the coordinates (x, y) on the road surface image 1601, and obtained by the following equations.

$$U = \begin{pmatrix} UX \\ UY \\ 0 \end{pmatrix} \quad (20)$$

$$UX = MX*(x-hx) \quad (21)$$

$$UY = MY*(y-hy) \quad (22)$$

The road surface image generation unit 611 may generate a road surface image at each time point by obtaining the pixel value v based on the equations (11) through (22) from the image captured by a camera at each time point included in image data.

Figure 18:
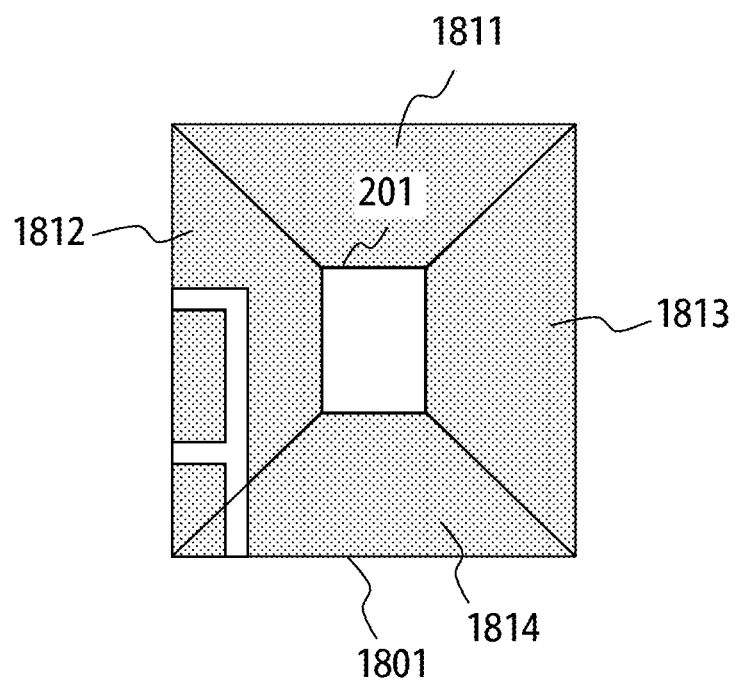
FIG. 18 illustrates a generated road surface image.

FIG. 18 is an example of a road surface image generated as described above. A road surface image 1801 in FIG. 18 includes partial images 1811 through 1814 in four directions, that is, forward, backward, left, and right of the moving body 201. In this case, the road surface image 1801 is generated using four camera images captured by four cameras (m=1 through 4) provided in the four directions, that is, forward, backward, left, and right of the moving body 201.

The conversion unit 1112 rotates the road surface image at the later time point of the road surface images at two time points based on the amount of turn between two time points. For example, when the road surface image 1601 in FIG. 16 is rotated by the amount-of-turn α, the pixel value v of the pixel corresponding to the coordinates (x, y) of the turned road surface image is obtained by the following equations.

$$v = \text{INTERP}(\text{road surface image before rotation}, rx, ry) \quad (31)$$

$$(0 <= rx < wx \text{ and } 0 <= ry < wy)$$

$$v = V\text{inv} \quad (32)$$

$$(rx < 0 \text{ or } rx >= wx \text{ or } ry < 0 \text{ or } ry >= wy)$$

In this case, (rx, ry) indicate the coordinates of the pixel corresponding to the coordinates (x, y) before rotation, and are obtained by the following equations.

$$rx = \cos(\alpha)*(x-hx) - \sin(\alpha)*(y-hy) + hx \quad (33)$$

$$ry = \sin(\alpha)*(x-hx) + \cos(\alpha)*(y-hy) + hy \quad (34)$$

Vinv is a pixel value indicating that the corresponding pixel is invalid. For example, a value exceeding the scope of the value allowed as a pixel value in a road surface image may be used as Vinv. When the image captured by a camera is a gray scale image of a brightness value, and the scope of the pixel value is 0 through 255, a value not less than 266 may be used. For example, Vinv equals 300.

INTERP (image, x, y) is a value obtained by interpolating a pixel value of a pixel corresponding to the coordinates (x, y) of an image. For example, Nearest interpolation, Bilinear interpolation, Sinc interpolation, or Cubic interpolation may be used in performing the interpolation. When Bilinear interpolation is used, INTERP (image, x, y) is obtained by the following equations.

$$px = \text{integer for which decimal places of coordinate value } x \text{ have been truncated} \quad (35)$$

$$py = \text{integer for which decimal places of coordinate value } y \text{ have been truncated} \quad (36)$$

$$dx = x - px \quad (37)$$

$$dy = y - py \quad (38)$$

$$P11 = \text{PVAL}(\text{image}, px, py) \quad (39)$$

$$P12 = \text{PVAL}(\text{image}, px+1, py) \quad (40)$$

$$P21 = \text{PVAL}(\text{image}, px, py+1) \quad (41)$$

$$P22 = \text{PVAL}(\text{image}, px+1, py+1) \quad (42)$$

$$v1 = (1-dx)*P11 + dx*P12 \quad (43)$$

$$v2 = (1-dx)*P21 + dx*P22 \quad (44)$$

$$\text{INTERP}(\text{image}, x, y) = (1-dy)*v1 + dy*v2 \quad (45)$$

PVAL(image, x, y) indicates a pixel value of a pixel corresponding to the coordinates (x, y) in the image.

Figure 19:
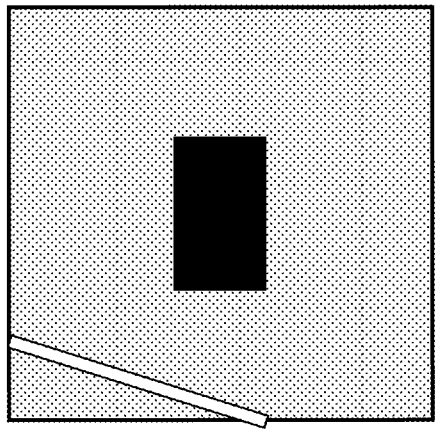
FIG. 19 illustrates a road surface image before rotation.
Figure 20:
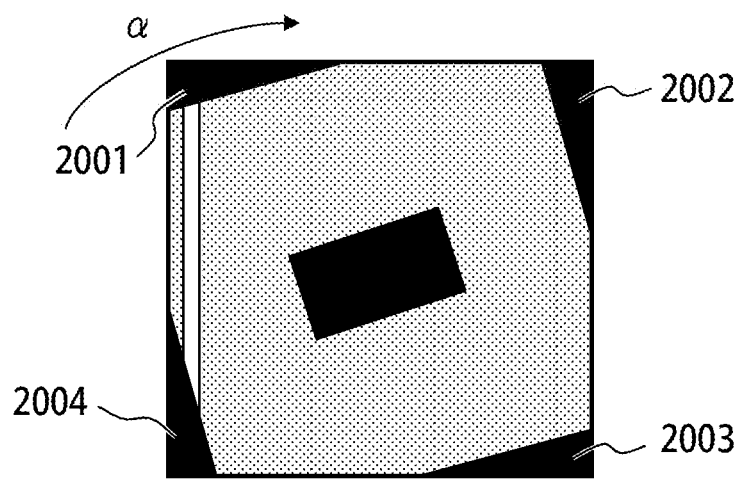
FIG. 20 illustrates a road surface image after rotation.

The conversion unit 1112 may generate a rotated road surface image by obtaining a pixel value v by the equations (31) through (34). For example, a road surface image illustrated in FIG. 20 is obtained by rotating the road surface image illustrated in FIG. 19 clockwise by the amount-of-turn α. In the road surface image in FIG. 20, four black corner areas 2001 through 2004 correspond to the areas of invalid pixels.

Figure 21:
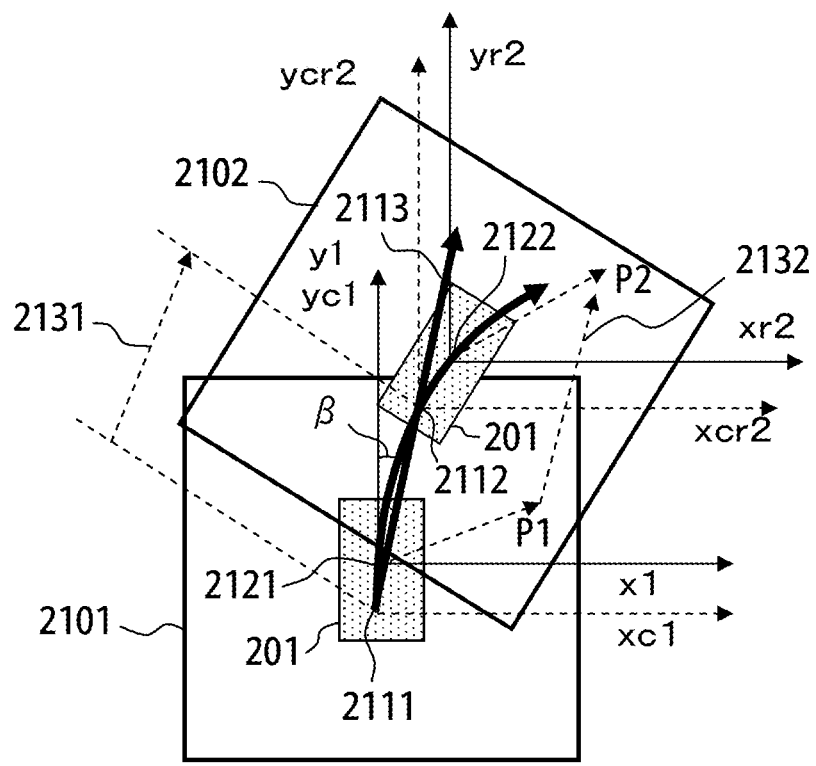
FIG. 21 illustrates a rotation center coordinate system and a road surface image coordinate system at two time points.

The travel direction estimation unit 613 determines the direction of travel of the moving body 201 based on the amount-of-turn α between two time points. FIG. 21 illustrates examples of a rotation center coordinate system and a road surface image coordinate system at each time point to be used in determining a direction of travel.

The rotation center coordinate system (xc1, yc1) is a 2-dimensional coordinate system having a rotation center 2111 of the moving body 201 at the time t1 as an origin. The yc1 axis is a coordinate axis in the direction of travel (forward) of the moving body 201, and the xc1 axis is a coordinate axis orthogonal to the direction of travel. The road surface image coordinate system (x1, y1) is a 2-dimensional coordinate system having a center 2121 of the moving body 201 at the time t1 as an origin. The y1 axis is a coordinate axis in the direction of the yc1 axis, and the x1 axis is a coordinates in the direction of the xc1 axis. The center 2121 of the moving body 201 matches the center of a road surface image 2101 at the time t1.

The rotation center coordinate system (xcr2, ycr2) is a 2-dimensional coordinate system having a rotation center 2112 of the moving body 201 at the time t2 as an origin. The ycr2 axis is a coordinate axis in the direction of the yc1 axis, and the xcr2 axis is a coordinate axis in the direction of the xc1 axis. The road surface image coordinate system (xr2, yr2) is a 2-dimensional coordinate system having a center 2122 of the moving body 201 at the time t2 as an origin. The yr2 axis is a coordinate axis in the direction of the ycr2 axis, and the xr2 axis is a coordinate axis in the direction of the xcr2 axis.

The center 2122 matches the center of the road surface image at the time t2, and also matches the center of a road surface image 2102 obtained by rotating by the amount-of-turn α the road surface image at the time t2.

By defining the angle made by the direction-of-travel 2113 of the moving body 201 and the yc1 axis as β, the equation (2) holds true. In the rotation center coordinate system (xc1, yc1), the equation of the straight line including the direction-of-travel 2113 is given as follows.

$$\cos(\beta)*xc1 - \sin(\beta)*yc1 = 0 \quad (51)$$

Assume that the coordinates of the rotation center 2111 in the road surface image coordinate system (x1, y1) is (cx, cy), and a translation vector 2131 of the origin of the rotation center coordinate system between the time t1 and the time t2 is (mx, my). Assuming that the coordinates of the point P1 in the road surface image coordinate system (x1, y1) are (X1, Y1), the coordinates of the point P1 in the rotation center coordinate system (xc1, yc1) are obtained by the following equations.

$$xc1 = X1 - cx \qquad (52)$$

$$yc1 = Y1 - cy \qquad (53)$$

The coordinates of the point P1 in the rotation center coordinate system (xcr2, ycr2) are obtained by the following equations.

$$xcr2 = xc1 - mx = (X1 - cx) - mx \qquad (54)$$

$$ycr2 = yc1 - my = (Y1 - cy) - my \qquad (55)$$

Assuming that the coordinates of the rotation center 2112 in the road surface image coordinate system (xr2, yr2) are (cxr2, cyr2), the coordinates of the point P1 in the road surface image coordinate system (xr2, yr2) are obtained by the following equations.

$$xr2 = xcr2 + cxr2 = (X1 - cx - mx) + cxr2 \qquad (56)$$

$$yr2 = ycr2 + cyr2 = (Y1 - cy - my) + cyr2 \qquad (57)$$

The coordinates (cxr2, cyr2) are obtained by rotating the coordinates (cx, cy) of the rotation center 2111 using the amount-of-turn α, and obtained by the following equations.

$$cxr2 = \cos(\alpha)*cx - \sin(\alpha)*cy \qquad (58)$$

$$cyr2 = \sin(\alpha)*cx + \cos(\alpha)*cy \qquad (59)$$

Assuming that a translation vector 2132 of the origin of the road surface image coordinate system between the time t1 and the time t2 is (qx, qy), the point P1 travels to the point P2 by the translation vector 2132. Then, the coordinates of the point P2 in the road surface image coordinate system (xr2, yr2) matches the coordinates (X1, Y1) of the point P1 in the road surface image coordinate system (x1, y1).

In this case, (qx, qy) is obtained as the difference between the coordinates (X1, Y1) of the point P2 in the road surface image coordinate system (xr2, yr2) and the coordinates of the point P1 in the road surface image coordinate system (xr2, yr2). From the equations (56) and (57), (qx, qy) is obtained by the following equations.

$$\begin{aligned}qx &= X1 - xr2 \\ &= X1 - (X1 - cx - mx) - cxr2 \\ &= (cx + mx) - cxr2\end{aligned} \qquad (60)$$

$$\begin{aligned}qy &= Y1 - yr2 \\ &= Y1 - (Y1 - cy - my) - cyr2 \\ &= (cy + my) - cyr2\end{aligned} \qquad (61)$$

From the equations (60) and (61), (mx, my) is obtained by the following equations.

$$mx = cxr2 + (qx - cx) \qquad (62)$$

$$my = cyr2 + (qy - cy) \qquad (63)$$

(mx, my) in the rotation center coordinate system (xc1, yc1) is obtained by the equations (62) and (63), and restricted on the straight line of the equation (51). Then, (mx, my) of the equations (62) and (63) is assigned to (xc1, yc1) of the equation (51), and the following equation is obtained by using the equations (58) and (59).

$$\begin{aligned}\cos(\beta)*mx - \sin(\beta)*my &= \cos(\beta)*(cxr2 + (qx - cx)) - \\ &\quad \sin(\beta)*(cyr2 + (qy - cy)) \\ &= \cos(\beta)*qx - \sin(\beta)*qy + \\ &\quad \cos(\beta)*(cxr2 - cx) - \sin(\beta)* \\ &\quad (cyr2 - cy) \\ &= \cos(\beta)*qx - \sin(\beta)*qy + \\ &\quad \cos(\beta)*((\cos(\alpha)*cx - \sin(\alpha)* \\ &\quad cy) - cx) - \sin(\beta)*((\sin(\alpha)* \\ &\quad cx + \cos(\alpha)*cy) - cy) \\ &= \cos(\beta)*qx - \sin(\beta)*qy - \cos(\beta)* \\ &\quad ((1 - \cos(\alpha))*cx + \sin(\alpha)*cy) + \\ &\quad \sin(\beta)*((1 - \cos(\alpha))*cy - \\ &\quad \sin(\alpha)*cx) \\ &= 0\end{aligned} \qquad (64)$$

The equation (64) is rewritten into the following equations.

$$A*qx + B*qy + C = 0 \qquad (65)$$

$$A = \cos(\beta) \qquad (66)$$

$$B = -\sin(\beta) \qquad (67)$$

$$C = -\cos(\beta)*((1-\cos(\alpha))*cx + \sin(\alpha)*cy) + \sin(\beta)*((1-\cos(\alpha))*cy - \sin(\alpha)*cx) \qquad (68)$$

The equation (65) indicates the straight line which restricts the position of the origin of the road surface image coordinate system (xr2, yr2). When the relative positional relationship between the road surface image 2101 and the road surface image 2102 is determined, (qx, qy) which satisfies the equation (65) is used as an amount of shift of the road surface image 2102.

The travel direction estimation unit 613 calculates the values of A, B, and C in the equations (66) through (68) using the equation (2), and stores in the storage unit 612 the values of A, B, and C as the direction information indicating the direction of shift of the road surface image 2102.

The collation unit 1113 obtains the position in which the image pattern of the road surface image 2101 is the most similar to the image pattern of the road surface image 2102 while shifting the road surface image 2102 from the road surface image 2101 along the direction indicated by the direction information.

Figure 22:
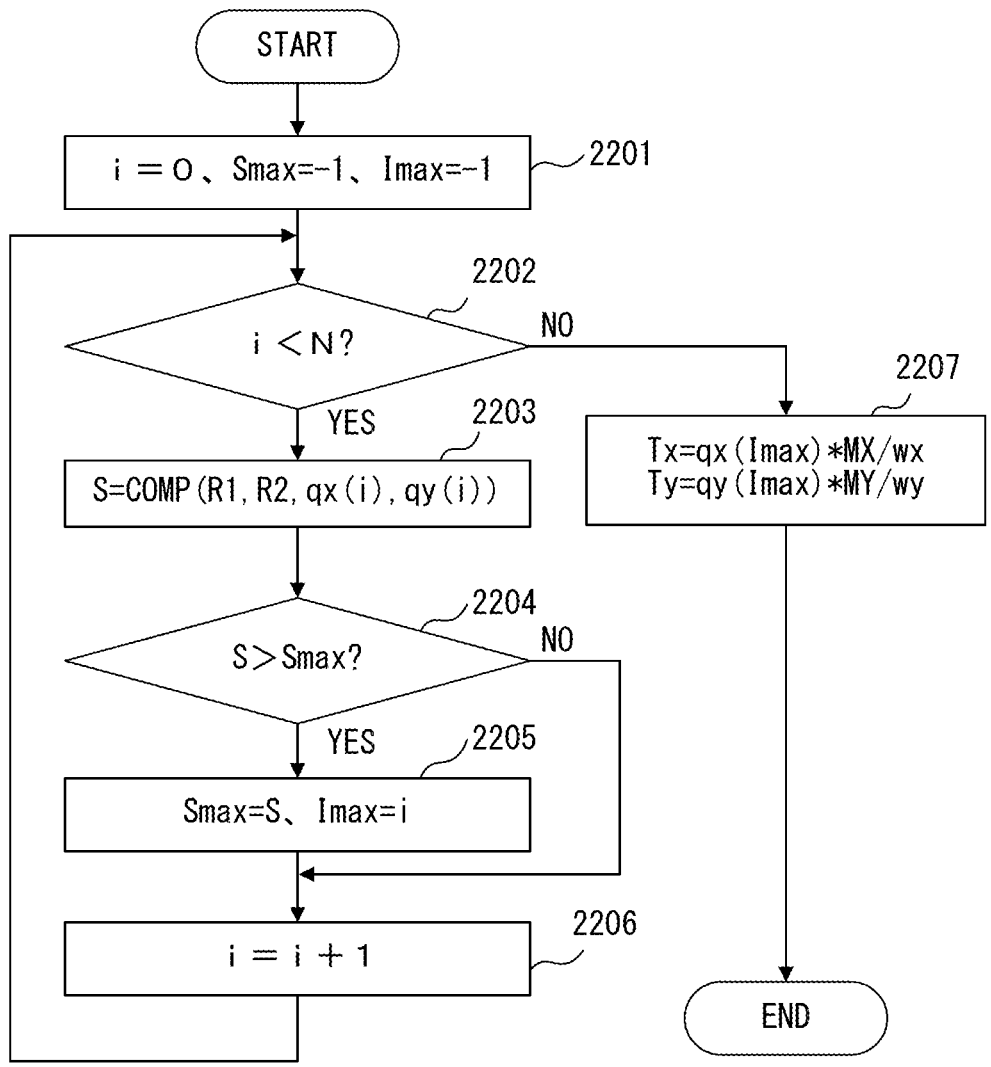
FIG. 22 is a flowchart of an image collating process.

FIG. 22 is a flowchart of an example of the image collating process performed by the collation unit 1113. First, the collation unit 1113 sets the variable i indicating the i-th amount of shift to 0, and sets the variable Smax indicating the maximum value of the similarity S between the image pattern of the road surface image 2101 and the image pattern of the road surface image 2102 to −1 (step 2201). Furthermore, the collation unit 1113 sets the variable Imax indicating the value of i corresponding to Smax to −1.

Next, the collation unit 1113 compares i with the total number N of the amounts of shift (step 2202). When i is smaller than N (YES in step 2202), the collation unit 1113 calculates the similarity S by the following equation (step 2203).

$$S=COMP(R1,R2,qx(i),qy(i)) \qquad (71)$$

As illustrated in FIG. 23, a road surface image R1 corresponds to the road surface image 2101, and a road surface image R2 corresponds to the road surface image 2102. Assume that the road surface image R2 has the same shape as the road surface image R1.

A vector 2301 indicates the i-th amount of shift (i=0 through N−1) when the road surface image R2 is shifted from the road surface image R1. The component of the vector 2301 may be described by, for example, the road surface image coordinate system (x, y) of the road surface image R1, that is, (qx(i), qy(i)). N sets (qx(i), qy(i)) correspond to the coordinates of N points on the straight line indicated by the following equation, and defines the perturbation range of the road surface image R2.

$$A*x+B*y+C=0 \qquad (72)$$

As COMP(R1, R2, qx, qy) of the equation (71), for example, the similarity between the image pattern of the road surface image R1 and the image pattern of the road surface image R2 which belong to a common area 2302 of the road surface image R1 and the road surface image R2 in FIG. 2 may be used. In this case, the similarity sj of the j-th pixel pair which belongs to the common area 2302 may be calculated by, for example, the following equation (j=1 through Nc).

$$sj=VL-|PVAL(R1,ux(j),uy(j))-PVAL(R2,ux(j)-qx,uy(j)-qy)| \qquad (73)$$

PVAL(R, x, y) indicates the pixel value of the pixel corresponding to the coordinates (x, y) of the road surface image R, and (ux(j), uy(j)) indicates the coordinates of the j-th pixel of the road surface image R1 belonging to the common area 2302. The total number of pixels of the road surface image R1 which belongs to the common area 2302 is Nc. (qx, qy) indicates the component of the vector 2301, and (ux(j)+qx, uy(j)+qy) indicates the coordinates of the j-th pixel of the road surface image R2 which belongs to the common area 2302. Therefore, the absolute value in the second term of the right side in the equation (73) indicates the difference absolute value of the pixel values of the j-th pixel pair which belongs to the common area 2302.

VL in the first term of the right side in the equation (73) is a constant to have sj which becomes the larger with the smaller difference absolute value, and is set as a sufficiently large value as compared with the difference in pixel value. When the range of the pixel value is 0 through 255, the value of not less than 266 may be used as a VL. For example, VL=300.

In this case, as COMP (R1, R2, qx, qy), the sum or average value of sj for Nc pixel pairs may be used. For example, the average value sa of sj is obtained by the following equation.

$$sa=(\Sigma sj)/Nc \qquad (74)$$

Σ in the right side of the equation (74) indicates the sum for j=1 through Nc, and sa becomes larger when the image pattern of the road surface image R1 and the image pattern of the road surface image R2 which belong to the common area 2302 are the more similar to each other.

The equations (73) and (74) are only an example of the similarity S, and the similarity S may be calculated using another calculating method. For example, in the equation (73), the square of the difference of the pixel values may be used instead of the difference absolute value of the pixel values, and the reciprocal of the difference absolute value or the reciprocal of the square of the difference may be used as sj instead of using the constant VL. Furthermore, the sum of sj may be used as COMP (R1, R2, qx, qy) instead of sa in the equation (74)

Next, the collation unit 1113 compares the similarity S with Smax (step 2204). When S is larger than Smax (YES in step 2204), Smax is updated to S, and Imax is updated to i (step 2205). Then, the collation unit 1113 increments i by 1 (step 2206), and repeats the processes in and after step 2202.

When S is not more than Smax (NO in step 2204), the collation unit 1113 performs the processes in and after step 2206 without updating Smax and Imax. When i reaches N (NO in step 2202), the collation unit 1113 terminates updating Smax, and determines the amount of travel based on the amount of shift corresponding to Imax (step 2207).

Smax where i reaches N corresponds to the maximum value of the similarity S in the perturbation range of the road surface image R2, and Imax then indicates (qx(j), qy(j)) which maximizes the similarity S.

Then, the collation unit 1113 may calculate the amount of travel (Tx, Ty) of the moving body 201 between the time t1 and the time t2 by the following equations using (qx(Imax), qy(Imax)).

$$Tx=qx(Imax)*MX/wx \qquad (75)$$

$$Ty=qy(Imax)*MY/wy \qquad (76)$$

It is also possible to expand the perturbation range of the road surface image R2 not only in the direction indicated by the direction information, but also in other directions by considering the calculation error of the direction information. In this case, the collation unit 1113 determines the weight for the amount of shift of the road surface image R2 so that the weight when the direction of shift matches the direction indicated by the direction information may be larger than the weight when they do not match. Then, the collation unit 1113 determines the amount of shift based on the product of the similarity between the road surface image R1 and the road surface image R2 and the weight.

For example, the collation unit 1113 may generate a weight map M(x, y) in which a large weight is assigned to the coordinates (x, y) in the road surface image R1 when the coordinates (x, y) are on the straight line in the equation (72) and in which the weight becomes smaller with the separation from the straight line. As the weight map M(x, y), for example, a weight which is the larger with the shorter distance may be used depending on the distance from the coordinates (x, y) in the road surface image R1 to the straight line.

Assuming that the coordinates of each pixel of the road surface image R1 are (px, py), the distance LL from the coordinates (px, py) to the straight line of the equation (72) is obtained by the following equations $$LL=|A*px+B*py+C|/\text{sqrt}(A*A+B*B) \qquad (81)$$

In this case, the weight WT may be defined by the following equation using, for example, the distance LL.

$$WT=\exp(-LL*LL/(\sigma*\sigma)) \qquad (82)$$

σ is a constant to define the degree of reducing the weight WT with the increase of the distance LL, and indicates the number of pixels. As σ, for example, the value not less than 2 may be used. By associating the weight WT with the coordinates (px, py), a weight map M(x, y) is generated. The equations (81) and (82) are examples of a weight WT, and the weight WT may be calculated using another calculating method.

FIG. 24 is an example of a weight map M(x, y). The value of the weight map M(x, y) in FIG. 24 is the maximum on a straight line 2401 of the equation (72), and becomes smaller with the separation from the straight line 2401.

When the weight map M(x, y) is used, the vicinal area of the straight line 2401 may be used as a perturbation range of the road surface image R2. For example, assuming that the width in the x direction of the vicinal area ranges from −DX pixel to +DX, and the width in the y direction ranges from −DY pixel to +DY, (qx (i), qy (i)) indicating the amount of shift is expressed by a set of points in the vicinal area, and the total number N is obtained by the following equation.

$$N=(2*DX+1)*(2*DY+1) \tag{83}$$

However, DX and DY are integers not less than 1. The collation unit 1113 calculates the product of the similarity between the road surface image R1 and the road surface image R2 corresponding to (qx(i), qy(i)) and the weight corresponding to (qx (i), qy (i)) as weighted similarity. Then, the collation unit 1113 obtains (qx(Imax), qy(Imax)) with which the weighted similarity is the maximum, and calculates the amount of travel (Tx, Ty) by the equations (75) and (76).

In this case, as COMP (R1, R2, qx, qy) of the equation (71), for example, the weighted similarity S by the following equation may be used.

$$S=sa*Mc \tag{84}$$

$$Mc=M(qx,qy) \tag{85}$$

"sa" in the equation (84) is an average value of sj in the equation (74), and Mc indicates the weight corresponding to (qx, qy) in the weight map M(x, y). The weighted similarity S indicates the larger value when the image pattern of the road surface image R1 and the image pattern of the road surface image R2 which belong to the common area 2302 are the more similar to each other. The weighted similarity S is the larger with (qx, qy) the closer to the straight line 2401.

The equation (84) is only an example of the weighted similarity S, and the weighted similarity S may be calculated in other calculating methods. For example, the sum of sj may be used instead of sa.

The definitions of the moving body coordinate system O-XYZ in FIG. 13, the road surface coordinate system O-XY in FIG. 14, the image coordinate system o-xy in FIG. 16, the image coordinate system px-py and the camera coordinate system QX-QY-QZ in FIG. 17 are only examples, and other coordinate systems of different positions and postures may be used. Furthermore, the definitions of the rotation center coordinate system (xc1, yc1), the road surface image coordinate system (x1, y1), the rotation center coordinate system (xcr2, ycr2), and the road surface image coordinate system (xr2, yr2) in FIG. 21 are only examples, and other coordinate systems of different positions and postures may be used.

In FIG. 8, the interval between the time t1 and the time t2 is sufficiently short, and the method of calculating the angle β when the travel of the moving body 201 between the two time points may be approximated by a circular motion is described above. However, practically in the system of analyzing the behavior of a vehicle and the system of measuring the position of an object by a travel stereo method based on the amount of travel and the video feature point trail, there is a case in which the amount of travel is to be determined between two more separate time points.

Logically, if the amount of travel between two adjacent time points is accumulated, the amount of travel between optical two time points may be determined. However, each time the amount of travel is practically accumulated, an error included in the amount of travel between two adjacent time points is accumulated, thereby possibly increasing the errors of the amount of travel.

Figure 25:
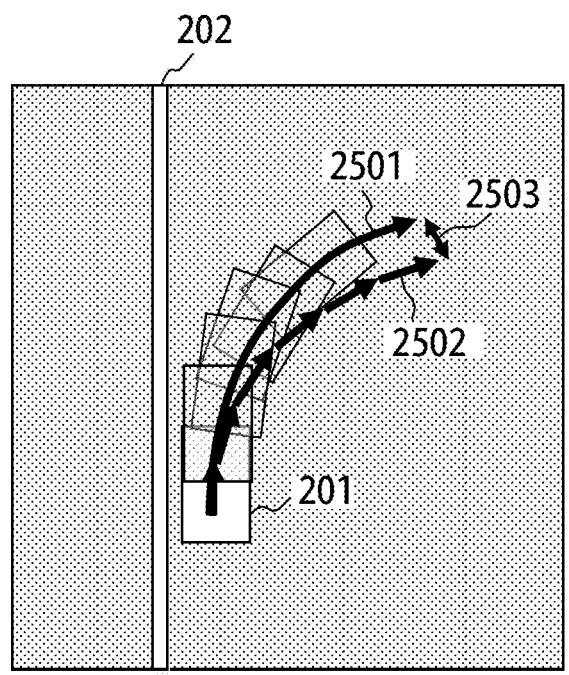
FIG. 25 illustrates the travel locus determined by accumulating the amount of travel.

For example, as illustrated in FIG. 25, there occurs an accumulation error 2503 between an actual travel locus 2501 of the moving body 201 and a travel locus 2502 determined by accumulating the amount of travel between two adjacent time points. Then, the higher the accumulation frequency of accumulating the amount of travel is, the more the accumulation error 2503 occurs.

the video data input from a camera includes a frame at plural time points, and a frame at each time point corresponds to an image captured by a camera. In the method of accumulating the amount of travel between two adjacent time points, the reference time t1 is updated for each frame in a time series.

On the other hand, to reduce accumulated errors, it is effective to minimize the accumulation frequency of an amount of travel. In this case, it is preferable to obtain an amount of travel between two more separate time points, not between adjacent two time points. Therefore, it is considered that the frame at the time t1 is fixed as a key frame under a specified condition and only the frame at the time t2 is updated in a time series without updating a reference time t1 each frame in a time series.

In this method, until the update of the key frame at the time t1, the amount of travel is calculated between the time t1 and the time t2, between the time t1 and the time t3, . . . , and between the time t1 and the time tn. Therefore, in calculating the amount of travel between the time t1 and the time tn, the amount of travel between the time t2 through the time t(n−1) is not accumulated, thereby not accumulating errors.

Figure 26:
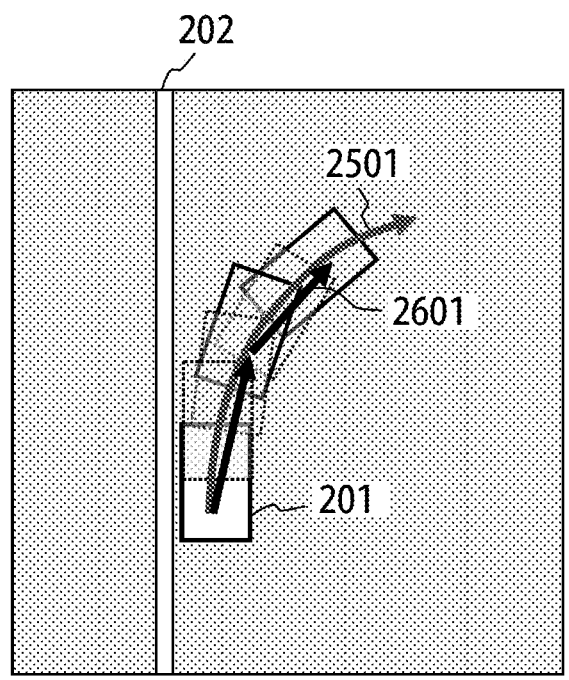
FIG. 26 illustrates the travel locus from which an accumulated error has been reduced.

For example, in FIG. 26, the moving body 201 at the time of the key frame is indicated by a solid line, and the moving body 201 at the time of the frame existing between two key frames is indicated by a broken line. As illustrated in FIG. 26, since the time interval between two key frames is longer than one frame, the accumulation frequency of the amount of travel decreases. Therefore, the accumulated error between the actual travel locus 2501 of the moving body 201 and a travel locus 2601 determined by accumulating the amount of travel between two key frames is reduced.

The key frame at the reference time t1 may be replaced with the latest frame when, for example, the size of the amount of travel accumulated after finally updating the key frame exceeds a specified amount. Thus, the key frame is updated each time the moving body 201 travels a specified distance.

However, since the moving body 201 travels while changing the direction, it is difficult to approximate the travel of the moving body 201 by circular motion if the time interval between two key frames becomes long.

Figure 27:
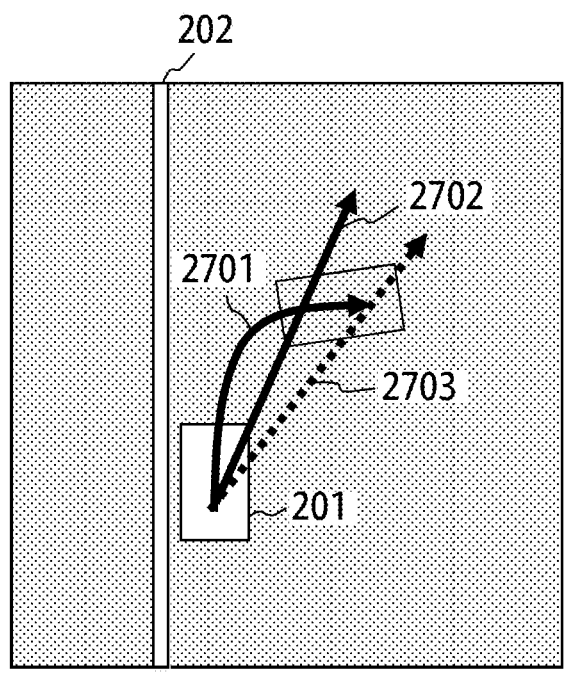
FIG. 27 illustrates the deviation of the estimated direction of travel from the actual direction of travel.

For example, as illustrated in FIG. 27, when the moving body 201 travels along a travel locus 2701 between two key frames, there occurs a deviation between an actual travel direction 2702 and a travel direction 2703 estimated from the amount-of-turn α by the equation (2). In this case, the accuracy of the estimated amount of travel may be reduced by using the restriction by equation (2).

Then, the inventors propose a recurrent travel amount estimating method by recognizing that the travel of a moving body may be approximated by a circular motion in a short time, and the position of the moving body may be sequentially obtained in a time series.

As illustrated in FIG. 28, the frame at the time t1 is defined as a key frame, the frame at the time t is defined as the frame to be calculated, and the time before the time t by one time point is defined as the time (t−1). Then, assume that the moving body 201 travels along a travel locus 2801. In this case, the amount of travel (Tx(t), Ty(t)) of the moving body 201 between the time t1 and the time t is determined. Tx(t) indicates the component in the right direction in the key frame, and Ty(t) indicates the component in the forward direction in the key frame.

Since the position of the moving body 201 may be sequentially determined, it is assumed that the amount of travel (Tx(t−1), Ty(t−1)) of the moving body 201 between the time t1 and the time (t−1) has already been determined by the calculation of the amount of travel at the time (t−1). Therefore, assume that the accumulated amount-of-turn $\alpha c(t-1)$ from the time t1 to the time (t−1) has been determined by the calculation of the amount of travel at the time (t−1). In addition, assume that the amount-of-turn $\alpha$ (t) between the time (t−1) and the time t has been input, and a road surface image at the time t has been generated.

First, consider the relationship between the time (t−1) and the time t. Since the interval between the time (t−1) and the time t is short, the travel of the moving body 201 during the period may be approximated by a circular motion. Therefore, as illustrated in FIG. 29, the angle β indicating a travel direction 2802 of the moving body 201 between the time (t−1) and the time t may be described by the following equation using the amount-of-turn $\alpha(t)$ during the period.

$$\beta = \alpha(t)/2 \qquad (91)$$

The rotation center coordinate system (xc(t−1), yc(t−1)) in FIG. 29 is a 2-dimensional coordinate system in which the rotation center of the moving body 201 at the time (t−1) is an origin.

Figure 30:
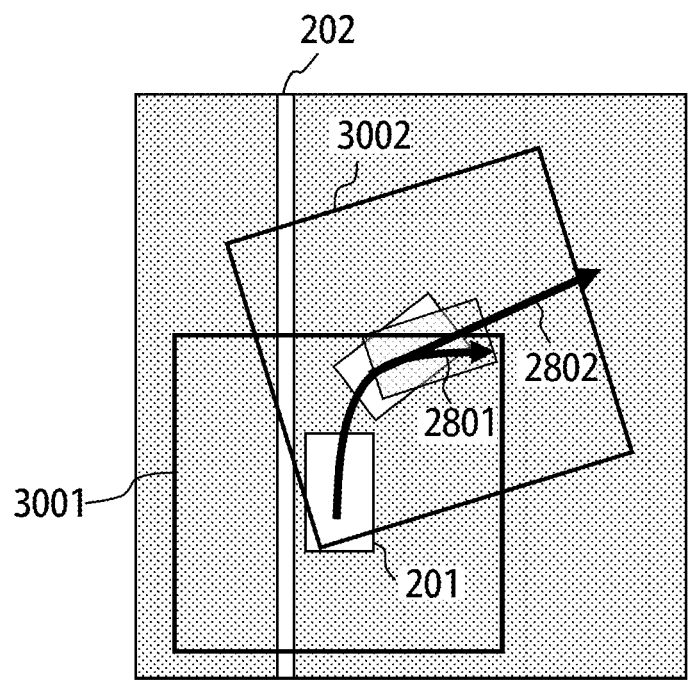
FIG. 30 illustrates a moving body at three time points and a road surface image at two time points.

Next, consider the relationship between the time t1 and the time t. As illustrated in FIG. 30, assume that a road surface image 3001 at the time t1 and a road surface image 3002 at the time t have been generated. The road surface image 3001 and the road surface image 3002 are arranged side by side as illustrated in FIG. 31.

The accumulated amount-of-turn $\alpha c(t)$ from the time t1 to the time t is obtained by the following equation using the accumulated amount-of-turn $\alpha c(t-1)$ from the time t1 to the time (t−1) and the amount-of-turn $\alpha(t)$ between the time (t−1) and the time t.

$$\alpha c(t) = \alpha c(t-1) + \alpha(t) \qquad (92)$$

As illustrated in FIG. 32, when the road surface image 3002 is rotated by $\alpha c(t)$, the direction of the road surface pattern 202 matches the road surface image 3001, and the road surface image shifted from side to side and up and down by the amount of shift corresponding to the amount of travel is obtained. In this case, the rotation center of the moving body 201 in the rotated road surface image 3002 is positioned on the straight line indicated by the travel direction 2802.

Therefore, in the image collation between the road surface image 3001 and the road surface image 3002, the perturbation range of the road surface image 3002 may be restricted in the direction indicated by an arrow 3301. Thus, although the travel of the moving body 201 from the time t1 to the time t is not approximated by a circular motion, the 2-dimensional perturbation may be restricted to the 1-dimensional perturbation.

Accordingly, although there is only a linear road surface pattern, the relative positional relationship between the road surface image 3001 and the road surface image 3002 is uniquely determined, thereby determining a correct amount of travel (Tx(t), Ty(t)). At and after the time (t+1) after the time t, a similar process is repeated until a key frame is updated.

As described later, in the recurrent travel amount estimating method, the amount of travel (Tx(t), Ty(t)) at the time t is calculated using the amount of travel (Tx(t−1), Ty(t−1)) at the time (t−1) and the accumulated amount-of-turn $\alpha c(t-1)$.

When the time t is the time t2 immediately after the time t1, the time (t−1) matches the time t1. Since the moving body 201 at the time t1 is in the initial state before travel, the amount of travel (Tx(t1), Ty(t1)) at the time t1 may be set to (0, 0), and the accumulated amount-of-turn $\alpha c$ (t1) may be set to 0. Therefore, the recurrent travel amount estimating method may be recurrently applied without losing generality.

Thus, the travel amount estimating method using the restriction on the direction of travel of a moving body may be applied to a general motion.

FIG. 34 is an example of the third functional configuration of the travel amount estimation device using a recurrent travel amount estimating method. A travel amount estimation device 3401 illustrated in FIG. 34 has a configuration obtained by adding an update unit 3411 and a turn amount accumulation unit 3412 to the configuration of the travel amount estimation device 1101 illustrated in FIG. 11.

Figure 35:
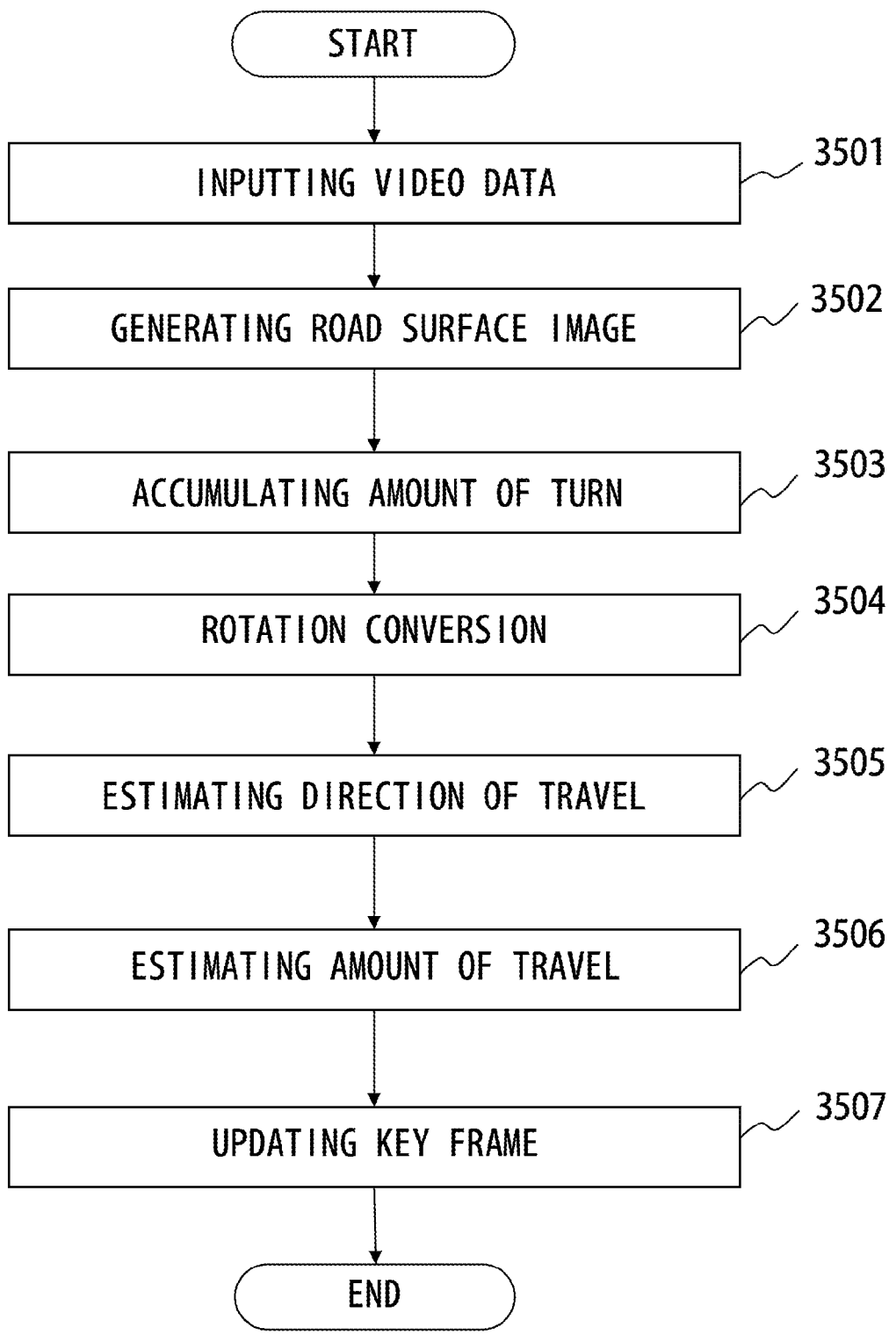
FIG. 35 is a flowchart of the third travel amount estimating process.

FIG. 35 is a flowchart of an example of the travel amount estimating process performed by the travel amount estimation device 3401 in FIG. 34. The processes in steps 3501 and 3502 in FIG. 35 are similar to the processes in steps 1201 and 1202 in FIG. 12.

When a road surface image is generated, the turn amount accumulation unit 3412 determines the accumulated amount of turn by accumulating the input amount of turn, and stores the accumulated amount in the storage unit 612 (step 3503). In this case, when the amount-of-turn $\alpha(t)$ at the time t is input, the turn amount accumulation unit 3412 adds the amount-of-turn $\alpha(t)$ to the accumulated amount-of-turn $\alpha c(t-1)$ at the time (t−1), and obtains the accumulated amount-of-turn $\alpha c(t)$ at the time t.

Assume that the amount-of-turn $\alpha(t)$ at the time t is an, the accumulated amount-of-turn $\alpha c$ (t−1) at the time (t−1) is acp, and the accumulated amount-of-turn $\alpha c(t)$ at the time t is αcn. When the amount-of-turn $\alpha(t)$ is input, the turn amount accumulation unit 3412 stores the $\alpha(t)$ as an in the storage unit 612. Assume that the αcp is stored in the storage unit 612. In this case, the turn amount accumulation unit 3412 calculates the αcn by the following equation, and stores the αcn in the storage unit 612.

$$\alpha cn = \alpha cp \qquad (101)$$

$$\alpha cn = \alpha cn + \alpha n \qquad (102)$$

Thus, the amount-of-turn αn and the accumulated amount-of-turn αcn at the time t are stored in the storage unit 612.

Next, the conversion unit 1112 of the travel amount estimation unit 614 performs a process similar to the process in step 1203 in FIG. 12 using the accumulated amount-of-turn αcn stored in the storage unit 612 instead of the amount-of-turn α input externally (step 3504). Thus, the road surface image at the time t is rotated, and the rotated road surface image is stored in the storage unit 612.

Next, the travel direction estimation unit 613 determines the direction information depending on the direction of travel of the moving body 201 between the time (t−1) and the time t based on the amount-of-turn αn at the time t, and stores the direction information in the storage unit 612 (step 3505).

Next, the collation unit 1113 of the travel amount estimation unit 614 performs a process similar to the process in step 1205 in FIG. 12 using the road surface image corresponding to the key frame at the time t1 and the rotated road surface image at the time t (step 3506). Thus determined is the amount of travel of the moving body 201 between the time t1 and the time t. The collation unit 1113 stores the determined amount of travel in the storage unit 612.

The time (t+1) is used as a new time t, the time t is used as a new time (t−1), and the amount of travel of the moving body 201 at each time point may be obtained by repeating a similar process at a shifted time point.

The update unit 3411 updates a key frame when the amount of travel of the moving body 201 at the time t exceeds a specified amount (step 3507). An amount of travel for a new reference position may be determined by repeating a similar process using the updated key frame.

Figure 36:
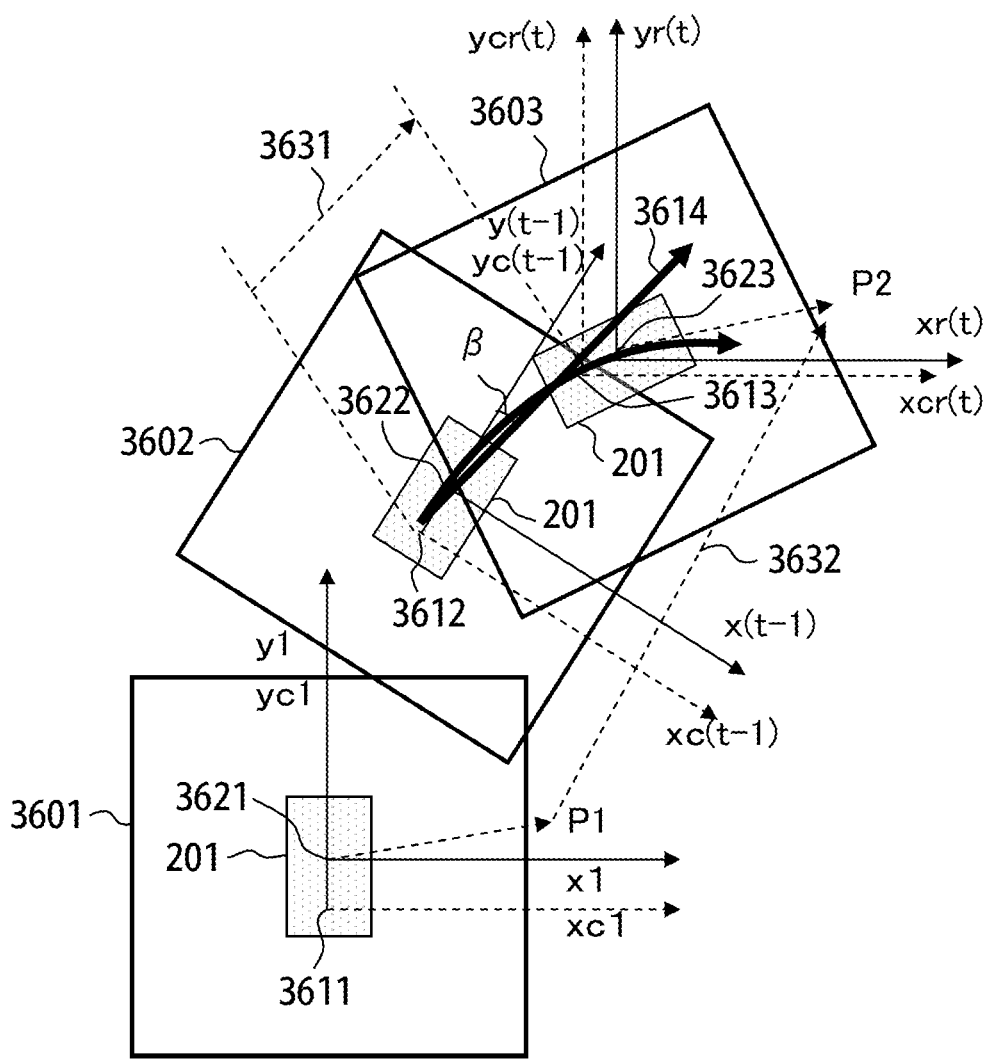
FIG. 36 illustrates a rotation center coordinate system and a road surface image coordinate system at three time points.

FIG. 36 illustrates examples of a rotation center coordinate system and a road surface image coordinate system used when the travel direction estimation unit 613 determines a direction of travel.

The rotation center coordinate system (xc1, yc1) is a 2-dimensional coordinate system having a rotation center 3611 of the moving body 201 at the time t1 as an origin. The yc1 axis is a coordinate axis of the direction of travel of the moving body 201, and the xc1 axis is a coordinate axis orthogonal to the direction of travel. The road surface image coordinate system (x1, y1) is a 2-dimensional coordinate system having a center 3621 of the moving body 201 at the time t1 as an origin. The y1 axis is a coordinate axis in the direction of the yc1 axis, and the x1 axis is a coordinate axis in the direction of the xc1 axis. The center 3621 of the moving body 201 matches the center of a road surface image 3601 at the time t1.

The rotation center coordinate system (xc(t−1), yc(t−1)) is a 2-dimensional coordinate system having a rotation center 3612 of the moving body 201 at the time (t−1) as an origin. The yc(t−1) axis is a coordinate axis in the direction of travel of the moving body 201, and the xc(t−1) axis is a coordinate axis orthogonal to the direction of travel. The road surface image coordinate system (x(t−1), y(t−1)) is a 2-dimensional coordinate system having a center 3622 of the moving body 201 at the time (t−1) as an origin. The y(t−1) axis is a coordinate axis in the direction of the yc(t−1) axis, and the x(t−1) axis is a coordinate axis in the direction of the xc(t−1) axis.

The center 3622 of the moving body 201 matches the center of the road surface image at the time (t−1), and also matches the center of a road surface image 3602 obtained by rotating the road surface image at the time (t−1) by the accumulated amount-of-turn αcp.

The rotation center coordinate system (xcr(t), ycr(t)) is a 2-dimensional coordinate system having a rotation center 3613 of the moving body 201 at the time t as an origin. The ycr(t) axis is a coordinate axis in the direction of the yc1 axis, and the xcr(t) axis is a coordinate axis in the direction of the xc1 axis. The road surface image coordinate system (xr(t), yr(t)) is a 2-dimensional coordinate system having a center 3623 of the moving body 201 at the time t as an origin. The yr(t) axis is a coordinate axis in the direction of the ycr(t) axis, and the xr(t) axis is a coordinate axis in the direction of the xcr(t) axis.

The center 3623 of the moving body 201 matches the center of the road surface image at the time t, and also matches the center of a road surface image 3603 obtained by rotating the road surface image at the time t by the accumulated amount-of-turn αcn.

Assuming that the angle made by the direction of travel 3614 of the moving body 201 and the yc(t−1) axis is β, the following equation holds true by the equation (91).

$$\beta = \alpha n/2 \qquad (111)$$

In the rotation center coordinate system (xc(t−1), yc(t−1)), the equation of the straight line including the direction of travel 3614 is obtained by the following equation.

$$\cos(\beta)*xc(t-1) - \sin(\beta)*yc(t-1) = 0 \qquad (112)$$

The amount of rotation in the coordinate conversion from the road surface image coordinate system (x1, y1) to the road surface image coordinate system (x(t−1), y(t−1)) is obtained by the accumulated amount of turn αcp at the time (t−1). The translation travel amount in the coordinate conversion is obtained by converting the amount of travel (Tx(t−1), Ty(t−1)) of the moving body 201 at the time (t−1) into the translation travel amount (qxp, qyp) in the road surface image coordinate system (x(t−1), y(t−1)). In this case, the relationship between the road surface image coordinate system (x(t−1), y(t−1)) and the road surface image coordinate system (x1, y1) is obtained by the following equation.

$$x(t-1) = \cos(\alpha cp)*(x1-qxp) - \sin(\alpha cp)*(y1-qyp) \qquad (113)$$

$$y(t-1) = \sin(\alpha cp)*(x1-qxp) + \cos(\alpha cp)*(y1-qyp) \qquad (114)$$

Assuming that the coordinates of the point P1 in the road surface image coordinate system (x1, y1) are (X1, Y1), the coordinates of the point P1 in the road surface image coordinate system (x(t−1), y(t−1)) are obtained by the following equations from the equations (113) and (114).

$$x(t-1) = \cos(\alpha cp)*(X1-qxp) - \sin(\alpha cp)*(Y1-qyp) \qquad (115)$$

$$y(t-1) = \sin(\alpha cp)*(X1-qxp) + \cos(\alpha cp)*(Y1-qyp) \qquad (116)$$

Assume that the coordinates of the rotation center 3611 in the road surface image coordinate system (x1, y1) are (cx, cy), and a translation vector 3631 of the origin on the rotation center coordinate system between the time (t−1) and the time t is (mx, my). In this case, the coordinates of the point P1 in the rotation center coordinate system (xc(t−1), yc(t−1)) are obtained by the following equation.

$$\begin{aligned} xc(t-1) &= x(t-1) - cx \\ &= \cos(\alpha cp)*(X1-qxp) - \sin(\alpha cp)* \\ &\quad (Y1-qyp) - cx \end{aligned} \qquad (117)$$

$$\begin{aligned} yc(t-1) &= y(t-1) - cy \\ &= \sin(\alpha cp)*(X1-qxp) + \cos(\alpha cp)* \\ &\quad (Y1-qyp) - cy \end{aligned} \qquad (118)$$

Considered next is the coordinate conversion from the rotation center coordinate system (xc(t−1), yc(t−1)) to the rotation center coordinate system (xcr(t−1), ycr(t−1)). The moving body 201 turns by the amount-of-turn αn between the time (t−1) and the time t, and the amount of rotation of the road surface image 3603 at the time t is obtained by the accumulated amount of turn αcn. Therefore, the amount of rotation in the coordinate conversion is obtained by the following equation.

$$\alpha n - \alpha cn = \alpha n - (\alpha cp + \alpha n) = -\alpha cp \quad (119)$$

In this case, the coordinates of the point P1 in the rotation center coordinate system (xcr(t), ycr(t)) are obtained by the following equation.

$$\begin{aligned} xcr(t) &= \cos(-\alpha cp)*(xc(t-1)-mx) - \sin(-\alpha cp)* \\ &\quad (yc(t-1)-my) \\ &= \cos(\alpha cp)*(xc(t-1)-mx) + \sin(\alpha cp)* \\ &\quad (yc(t-1)-my) \\ &= \cos(\alpha cp)*xc(t-1) + \sin(\alpha cp)*yc(t-1) - \\ &\quad (\cos(\alpha cp)*mx + \sin(\alpha cp)*my) \\ &= X1 - qxp - (\cos(\alpha cp)*(cx+mx) + \sin(\alpha cp)* \\ &\quad (cy+my)) \end{aligned} \quad (120)$$

$$\begin{aligned} ycr(t) &= \sin(-\alpha cp)*(xc(t-1)-mx) + \cos(-\alpha cp)* \\ &\quad (yc(t-1)-my) \\ &= -\sin(\alpha cp)*(xc(t-1)-mx) + \cos(\alpha cp)* \\ &\quad (yc(t-1)-my) \\ &= Y1 - qyp - (-\sin(\alpha cp)*(cx+mx) + \cos(\alpha cp)* \\ &\quad (cy+my)) \end{aligned} \quad (121)$$

Assuming that the coordinates of the rotation center 3613 in the road surface image coordinate system (xr(t), yr(t)) are (cxr(t), cyr(t)), the coordinates of the point P1 in the road surface image coordinate system (xr(t), yr(t)) are obtained by the following equations from the equations (120) and (121).

$$\begin{aligned} xr(t) &= xcr(t) + cxr(t) \\ &= X1 - qxp - (\cos(\alpha cp)*(cx+mx) + \sin(\alpha cp)* \\ &\quad (cy+my)) + cxr(t) \end{aligned} \quad (122)$$

$$\begin{aligned} yr(t) &= ycr(t) + cyr(t) \\ &= Y1 - qyp - (-\sin(\alpha cp)*(cx+mx) + \cos(\alpha cp)* \\ &\quad (cy+my)) + cyr(t) \end{aligned} \quad (123)$$

The coordinates (cxr(t), cyr(t)) are obtained by the rotation conversion of the coordinates (cx, cy) using the accumulated amount of turn αcn, and calculated by the following equations.

$$cxr(t) = \cos(\alpha cn)*cx - \sin(\alpha cn)*cy \quad (124)$$

$$cyr(t) = \sin(\alpha cn)*cx + \cos(\alpha cn)*cy \quad (125)$$

Assuming that a translation vector 3632 of the origin of the road surface image coordinate system between the time t1 and the time t is (qx, qy), the point P1 travels to the point P2 by the translation vector 3632. Then, the coordinates of the point P2 in the road surface image coordinate system (xt(t), yr(t)) match the coordinates (X1, Y1) of the point P1 in the road surface image coordinate system (x1, y1).

In this case, (qx, qy) is obtained as a difference between the coordinates (X1, Y1) of the point P2 in the road surface image coordinate system (xr(t), yr(t)) and the coordinates of the point P1 in the road surface image coordinate system (xr(t), yr(t)). (qx, qy) is obtained by the following equations from the equations (122) and (123).

$$\begin{aligned} qx &= X1 - xr(t) \\ &= qxp + (\cos(\alpha cp)*(cx+mx) + \sin(\alpha cp)* \\ &\quad (cy+my)) - cxr(t) \end{aligned} \quad (126)$$

$$\begin{aligned} qy &= Y1 - yr(t) \\ &= qyp + (-\sin(\alpha cp)*(cx+mx) + \cos(\alpha cp)* \\ &\quad (cy+my)) - cyr(t) \end{aligned} \quad (127)$$

From the equations (126) and (127), (mx, my) is obtained by the following equations.

$$mx = \cos(\alpha cp)*(cxr(t)+qx-qxp) - \sin(\alpha cp)*(cyr(t)+qy-qyp) - cx \quad (128)$$

$$my = \sin(\alpha cp)*(cxr(t)+qx-qxp) + \cos(\alpha cp)*(cyr(t)+qy-qyp) - cy \quad (129)$$

(mx, my) in the rotation center coordinate system (xc(t−1), yc(t−1)) is obtained by the equations (128) and (129), and restricted on the straight line of the equation (112). Then, (mx, my) in the equations (128) and (129) is assigned to (xc(t−1), yc(t−1)) in the equation (112), and the following equation is obtained using the equations (124) and (125).

$$\begin{aligned} \cos(\beta)*mx - \sin(\beta)*my &= \cos(\beta)*(\cos(\alpha cp)*(cxr(t)+qx- \\ &\quad qxp) - \sin(\alpha cp)*(cyr(t)+qy- \\ &\quad qyp) - cx) - \sin(\beta)*(\sin(\alpha cp)* \\ &\quad (cxr(t)+qx-qxp) + \cos(\alpha cp)* \\ &\quad (cyr(t)+qy-qyp) - cy) \\ &= \cos(\beta+\alpha cp)*(qx-qxp+ \\ &\quad cxr(t)) - \sin(\beta+\alpha cp)*(qy- \\ &\quad qyp+cyr(t)) - (\cos(\beta)*cx - \\ &\quad \sin(\beta)*cy) \\ &= \cos(\beta+\alpha cp)*qx - \sin(\beta+\alpha cp)* \\ &\quad qy - (\cos(\beta+\alpha cp)*qxp - \\ &\quad \sin(\beta+\alpha cp)*qyp) + (\cos(\beta+ \\ &\quad \alpha cp)*cxr(t) - \sin(\beta+\alpha cp)* \\ &\quad cyr(t)) - (\cos(\beta)*cx - \sin(\beta)*cy) \\ &= 0 \end{aligned} \quad (130)$$

The equation (130) is rewritten as follows.

$$A*qx + B*qy + C = 0 \quad (131)$$

$$A = \cos(\beta + \alpha cp) \quad (132)$$

$$B = -\sin(\beta + \alpha cp) \quad (133)$$

$$C = -(\cos(\beta+\alpha cp)*qxp - \sin(\beta+\alpha cp)*qyp) + (\cos(\beta+\alpha cp)*cxr(t) - \sin(\beta+\alpha cp)*cyr(t)) - (\cos(\beta)*cx - \sin(\beta)*cy) \quad (134)$$

The equation (131) expresses the straight line which restricts the position of the origin of the road surface image coordinate system (xr(t), yr(t)). When the relative positional relationship between the road surface image 3601 and the road surface image 3603 is obtained, the (qx, qy) which satisfies the equation (131) is used as an amount of shift of the road surface image 3603.

The travel direction estimation unit 613 calculates the values of A, B, and C in the equations (132) through (134) using the equations (111), (124), and (125), and stores in the storage unit 612 the values of A, B, and C as the direction information indicating the direction of shift of the road surface image 3603.

Figure 37:
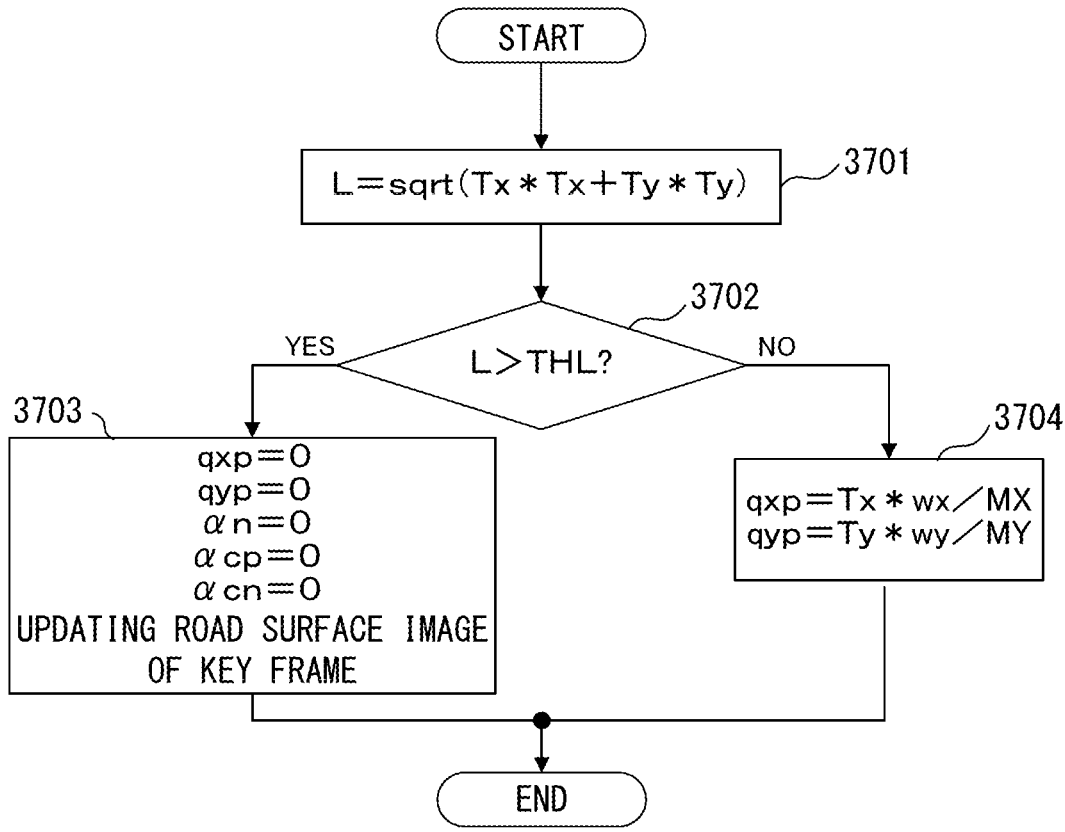
FIG. 37 is a flowchart of the key frame updating process.

FIG. 37 is a flowchart of an example of the key frame updating process performed by the update unit 3411. First, the update unit 3411 calculates the length L of the amount of travel by the following equation using the amount of travel (Tx, Ty) at the time t (step 3701).

$$L = \text{sqrt}(Tx*Tx + Ty*Ty) \quad (141)$$

Next, the update unit 3411 compares L with a threshold THL (step 3702). When L is larger than THL (YES in step 3702), qxp, qyp, αn, αcp, and αcn are updated by the following equation (step 3703).

$$qxp = 0 \quad (142)$$

$$qyp = 0 \quad (143)$$

$$\alpha n = 0 \quad (144)$$

$$\alpha cp = 0 \quad (145)$$

$$\alpha cn = 0 \quad (146)$$

The update unit 3411 stores in the storage unit 612 the road surface image before the rotation at the time t as a road surface image corresponding to a new key frame. Thus, the translation travel amount (qxp, qyp) is updated to (0, 0), the amount-of-turn αn, the accumulated amount of turn αcp, and the accumulated amount of turn αcn are updated to 0, and the road surface image corresponding to a key frame is updated. The threshold THL indicates the upper limit of the length of the amount of travel for update of the key frame. For example, the length of several tens cm may be used as THL.

On the other hand, when L is not more than THL (NO in step 3702), the update unit 3411 updates qxp and qyp by the following equations (step 3704).

$$qxp = Tx*wx/MX \quad (147)$$

$$qyp = Ty*wy/MY \quad (148)$$

Thus, the translation travel amount (qxp, qyp) is updated to the value corresponding to the amount of travel (Tx, Ty) at the time t. In this case, the road surface image corresponding to the key frame is not updated.

In the key frame updating process described above, a key frame is updated when the length of the amount of travel of the moving body 201 exceeds a specified amount, thereby determining the amount of travel based on a new position.

The travel amount estimation device 3401 in FIG. 34 may collate images between two road surface images using weighted similarity as with the road surface image 101 in FIG. 11. In this case, the collation unit 1113 calculates the similarity between the road surface image corresponding to the key frame at the time t1 and the rotated road surface image at the time t, and calculates the product of the similarity and the weight in the weight map as the weighted similarity.

The definitions of the rotation center coordinate system (xc1, yc1), the road surface image coordinate system (x1, y1), the rotation center coordinate system (xc(t−1), yc(t−1)), and the road surface image coordinate system (x(t−1), y(t−1)) are only examples, and other coordinate systems of the different position and posture may be used.

The configurations of the travel amount estimation device 601 in FIG. 6, the travel amount estimation device 1101 in FIG. 11, and the travel amount estimation device 3401 in FIG. 34 are only examples, and a part of the components may be omitted or varied depending on the usage or condition of a travel amount estimation device. For example, when video data captured by a camera is stored in advance in the storage unit 612, the input unit 1111 may be omitted.

It is not necessary that the number of cameras mounted on the moving body 201 is 4, but one or more cameras may be used. Even if the number of cameras is not more than 3, a road surface image can be generated from the captured video data.

The flowcharts illustrated in FIGS. 7, 12, 22, 35, and 37 are examples only, and a part of the processes may be omitted or varied depending on the configuration or condition of a travel amount estimation device. For example, the process in step 1204 in FIG. 12 may be performed before the process in step 1203, and the process in step 3505 in FIG. 35 may be performed before the process in step 3504.

In step 1203 in FIG. 12 or in step 3504 in FIG. 35, the conversion unit 1112 may rotate the road surface image at the earlier time point instead of the road surface image at the later time point between the road surface images at two time points. In this case, the collation unit 1113 may determine from the road surface image at the later time point the amount of shift corresponding to two road surface images while shifting the rotated road surface image at the earlier time point along the direction indicated by the direction information.

In steps 3702 and 3703 in FIG. 37, the update unit 3411 may update the key frame when the travel time or the number of frames exceeds a threshold instead of updating the key frame when the length of the amount of travel exceeds a threshold.

The equations (1) through (148) are examples only, and the equations may be changed depending on the configuration or the condition of a travel amount estimation device.

Figure 38:
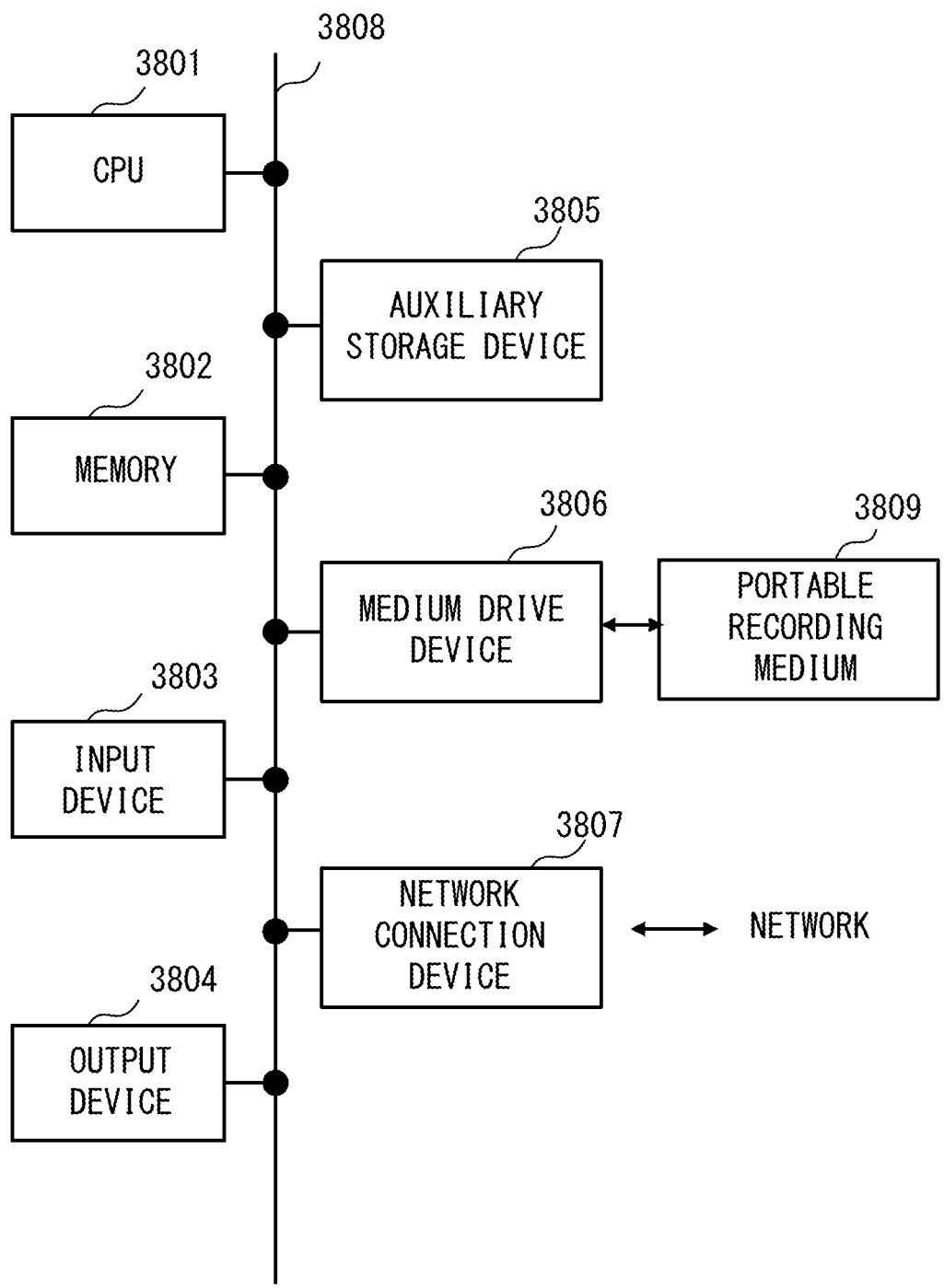
FIG. 38 illustrates a configuration of an information processing device.

The travel amount estimation device 601 in FIG. 6, the travel amount estimation device 1101 in FIG. 11, and the travel amount estimation device 3401 in FIG. 34 may be realized using, for example, an information processing device (computer) as illustrated in FIG. 38.

The information processing device in FIG. 38 includes a central processing unit (CPU) 3801, memory 3802, an input device 3803, an output device 3804, an auxiliary storage device 3805, a medium drive device 3806, and a network connection device 3807. These components are interconnected through a bus 3808.

The memory 3802 is, semiconductor memory such as read only memory (ROM), random access memory (RAM), flash memory, etc., and stores a program and data to be used in processing. The memory 3802 may used as the storage unit 612.

The CPU 3801 (processor) operates as the road surface image generation unit 611, the travel direction estimation unit 613, and the travel amount estimation unit 614 by, for example, executing a program using the memory 3802, thereby performing the travel amount estimating process. The CPU 3801 also operates as the conversion unit 1112, the collation unit 1113, the update unit 3411, and the turn amount accumulation unit 3412.

The input device 3803 is, for example, a keyboard, a pointing device, etc., and is used in inputting an instruction and information from a user or an operator. The output device 3804 is, for example, a display device, a printer, a speaker, etc., and is used in outputting an inquiry to a user or an operator, or a process result. The output process result includes, for example, the information about the amount of travel of the moving body 201.

The auxiliary storage device 3805 is, for example, a magnetic disk device, an optical disk device, a magneto optical disk device, a tape device, etc. The auxiliary storage device 3805 may be a hard disk device. The information processing device may store a program and data in the auxiliary storage device 3805 and load them into the 3802 for use.

The medium drive device 3806 drives a portable recording medium 3809, and accesses the stored contents. The portable recording medium 3809 is a memory device, a flexible disk, an optical disk, a magneto optical disk, etc. The portable recording medium 3809 may be a compact disk read only memory (CD-ROM), a digital versatile disk (DVD), a universal serial bus (USB) memory, etc. A user or an operator may store a program and data in the portable recording medium 3809 and load them into the memory 3802 for use.

Thus, the computer-readable recording medium which stores a program and data used in a travel amount estimating process is a physical (non-transitory) recording medium such as the memory 3802, the auxiliary storage device 3805, the portable recording medium 3809, etc.

The network connection device 3807 is a communication interface which is connected to a communication network such as a local area network (LAN), the Internet, etc. and converts data for communications. The network connection device 3807 may be used as the input unit 1111.

The information processing device may receive a process request and video data from a user terminal through the network connection device 3807, and may transmit to a user terminal the information about the amount of travel as a process result. The information processing device also may receive a program and data from an external device through the network connection device 3807 and load them into the memory 3802 for use.

It is not necessary for the information processing device to include all the components illustrated in FIG. 38, but a part of the components may be omitted depending on the use or condition. For example, when the information processing device receives a process request and video data from a user terminal via a communication network, the input device 3803 and the output device 3804 may be omitted. When the information processing device does not access the portable recording medium 3809, the medium drive device 3806 may be omitted. When the information processing device is not connected to a communication network, the network connection device 3807 may be omitted.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A travel amount estimation device, comprising
a processor configured to generate a first road surface image from an image at a first time captured by an imaging device mounted on a moving body, to generate a second road surface image from an image at a second time after the first time, to determine direction information depending on a direction of travel of the moving body between the first time and the second time from an amount of turn of the moving body between the first time and the second time, to rotate one road surface image of the first road surface image and the second road surface image on the basis of the amount of turn, to determine an amount of shift where the rotated one road surface image corresponds to another road surface image of the first road surface image and the second road surface image while shifting the rotated one road surface image and from the other road surface image by using the direction information, and to determine an amount of travel of the moving body between the first time and the second time on the basis of the amount of shift.

2. The travel amount estimation device according to claim 1, wherein
the processor determines the amount of shift while shifting the rotated one road surface image along a direction indicated by the direction information from the other road surface image.

3. The travel amount estimation device according to claim 1, wherein
the processor determines a plurality of weights for a plurality of amounts of shift of shifting the rotated one road surface image from the other road surface image so that a weight in case a direction of shift matches a direction indicated by the direction information is greater than a weight in case the direction of shift does not match the direction indicated by the direction information, and determines the amount of shift on the basis of a product of a similarity between the rotated one road surface image and the other road surface image and the weight while shifting the rotated one road surface image from the other road surface image.

4. The travel amount estimation device according to claim 1, wherein
the processor generates a third road surface image from an image at a third time after the second time, generates a fourth road surface image from an image at a fourth time after the third time, determines another direction information depending on a direction of travel of the moving body between the third time and the fourth time from a first accumulated amount of turn of the moving body between the first time and the third time, and an amount of turn of the moving body between the third time and the fourth time, determines a relative positional relationship between the first road surface image and the fourth road surface image by using a second accumulated amount of turn of the moving body between the first time and the fourth time and the other direction information, and determines an amount of travel of the moving body between the first time and the fourth time on the basis of the relative positional relationship between the first road surface image and the fourth road surface image.

5. The travel amount estimation device according to claim 4, wherein
the processor rotates a fifth road surface image that is one road surface image of the first road surface image and the fourth road surface image on the basis of the second accumulated amount of turn, determines an amount of shift where the rotated fifth road surface image corresponds to a sixth road surface image that is another road surface image of the first road surface image and the fourth road surface image while shifting the rotated fifth road surface image along a direction indicated by the other direction information from the sixth road surface image, and determines the amount of travel of the moving body between the first time and the fourth time on the basis of the determined amount of shift.

6. The travel amount estimation device according to claim 4, wherein the processor rotates a fifth road surface image that is one road surface image of the first road surface image and the fourth road surface image on the basis of the second accumulated amount of turn, determines a plurality of weights for a plurality of amounts of shift of shifting the rotated fifth road surface image from a sixth road surface image that is another road surface image of the first road surface image and the fourth road surface image so that a weight in case a direction of shift matches a direction indicated by the other direction information is greater than a weight in case the direction of shift does not match the direction indicated by the other direction information, determines an amount of shift where the rotated fifth road surface image corresponds to the sixth road surface image on the basis of a product of a similarity between the rotated fifth road surface image and the sixth road surface image and the weight corresponding to the direction of shift by which the rotated fifth road surface image is shifted while shifting the rotated fifth road surface image from the sixth road surface image, and determines the amount of travel of the moving body between the first time and the fourth time on the basis of the determined amount of shift.

7. A travel amount estimating method, comprising:

generating a first road surface image from an image at a first time captured by an imaging device mounted on a moving body;

generating a second road surface image from an image at a second time after the first time;

determining direction information depending on a direction of travel of the moving body between the first time and the second time from an amount of turn of the moving body between the first time and the second time;

rotating one road surface image of the first road surface image and the second road surface image on the basis of the amount of turn;

determining an amount of shift where the rotated one road surface image corresponds to another road surface image of the first road surface image and the second road surface image while shifting the rotated one road surface image from the other road surface image by using the direction information; and determining an amount of travel of the moving body between the first time and the second time on the basis of the amount of shift.

* * * * *